US006941387B1

(12) United States Patent
Takihara

(10) Patent No.: US 6,941,387 B1
(45) Date of Patent: Sep. 6, 2005

(54) ELECTRONIC EQUIPMENT CONTROLLING APPARATUS AND METHOD, ELECTRONIC EQUIPMENT CONTROLLING SYSTEM AND ELECTRONIC EQUIPMENT

(75) Inventor: Masahiro Takihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 660 days.

(21) Appl. No.: 09/021,783

(22) Filed: Feb. 11, 1998

(30) Foreign Application Priority Data

Feb. 17, 1997 (JP) .......................................... P9-031626

(51) Int. Cl.$^7$ .............................................. G06F 3/00
(52) U.S. Cl. ...................................................... 710/5
(58) Field of Search ................................. 709/208, 211, 709/238, 239, 240, 241, 242, 202; 710/5, 8, 10

(56) References Cited

U.S. PATENT DOCUMENTS

| | | | | |
|---|---|---|---|---|
| 5,757,925 A | * | 5/1998 | Faybishenko | 380/49 |
| 5,815,631 A | * | 9/1998 | Sugiyama et al. | 386/46 |
| 5,850,573 A | | 12/1998 | Wada | 710/62 |
| 5,887,193 A | * | 3/1999 | Takahashi et al. | 710/8 |
| 5,914,953 A | * | 6/1999 | Krause et al. | 370/392 |
| 6,020,881 A | * | 2/2000 | Naughton et al. | 345/327 |

FOREIGN PATENT DOCUMENTS

| | | | | |
|---|---|---|---|---|
| EP | 0626635 A2 | 11/1994 | ............. | G06F/3/00 |
| EP | 0637157 A2 | 2/1995 | ........... | H04L/29/06 |
| JP | 4-97468 | 3/1992 | ........... | G06F/13/14 |
| WO | 96/07971 | 3/1996 | ........... | G06F/13/38 |

OTHER PUBLICATIONS

A. Gefrides et al., "Standard Bus Connects up to 126 Peripherals: Plug and Play with USB," Applications and Connections, May 1996, pp. 36–38.
G. Hoffman et al., "IEEE 1394: A Ubiquitous Bus," IEEE Mar. 5, 1995, pp. 334–338.
IEEE Standard for a High Performance Serial Bus, IEEE Computer Society, Published Aug. 30, 1996, IEEE STD. 1394-1995, pp. 1–372.

* cited by examiner

*Primary Examiner*—Paul H. Kang
(74) *Attorney, Agent, or Firm*—Oblon, Spivak, McClelland, Maier & Neustadt, P.C.

(57) ABSTRACT

The invention provides an electronic equipment controlling apparatus and method and an electronic equipment controlling system by which functions of an electronic equipment can be utilized effectively. AV equipments are connected to a PC module by an IEEE 1394 cable. Each of the AV equipments includes a ROM in which information of function units built in the AV equipment is stored. Upon initialization, the PC module receives transmission of and stores the information of the function units of the AV equipments from the AV equipments. When an instruction to record data reproduced from a first one of the AV equipments onto a second one of the AV equipments is received, the PC module transfers data in accordance with the information of the function units stored therein and automatically searches for function units to be processed.

14 Claims, 29 Drawing Sheets

FIG. 11

| FUNCTION | MPEG I ENCODER | MPEG I DECODER | HARD DISK DRIVE |
|---|---|---|---|
| INPUT FORMAT | MOTION JPEG | MPEG I | DIGITAL DATA |
| OUTPUT FORMAT | MPEG I | MOTION JPEG | DIGITAL DATA |

MPEG I VIDEO DECK MODULE

FIG. 12

| FUNCTION | MO DRIVE |
|---|---|
| INPUT FORMAT | DIGITAL DATA |
| OUTPUT FORMAT | DIGITAL DATA |

MO DRIVE MODULE

FIG. 13

| FUNCTION | MPEG 2 DECODER | DVD-ROM DRIVE |
|---|---|---|
| INPUT FORMAT | MPEG 2 | NO |
| OUTPUT FORMAT | MOTION JPEG | DIGITAL DATA |

DVD PLAYER MODULE

FIG. 14

| FUNCTION | CD-R DRIVE |
|---|---|
| INPUT FORMAT | DIGITAL DATA |
| OUTPUT FORMAT | DIGITAL DATA |

CD-R DRIVE MODULE

FIG. 15

| FUNCTION | MD DRIVE | ATRAC ENCODER | ATRAC DECODER |
|---|---|---|---|
| INPUT FORMAT | DIGITAL DATA | PCM | ATRAC |
| OUTPUT FORMAT | DIGITAL DATA | ATRAC | PCM |

MD DRIVE MODULE

FIG. 16A
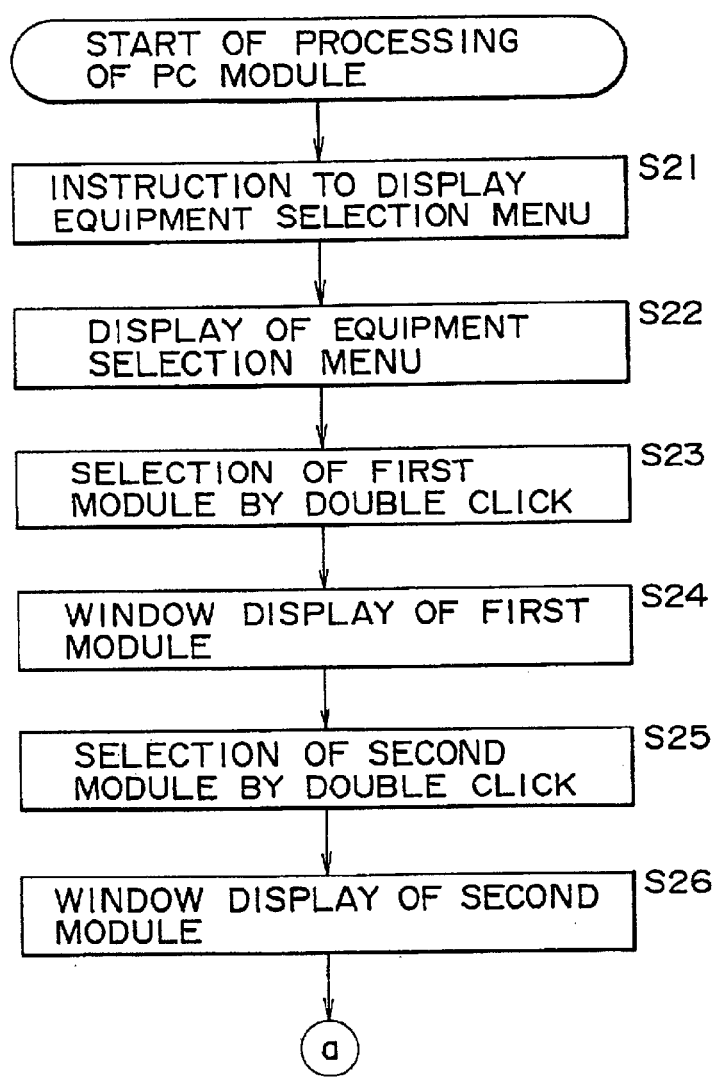
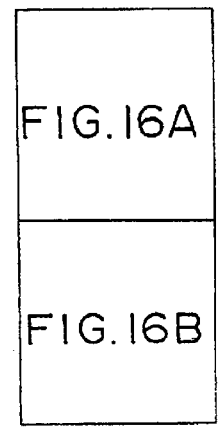

F I G. 18
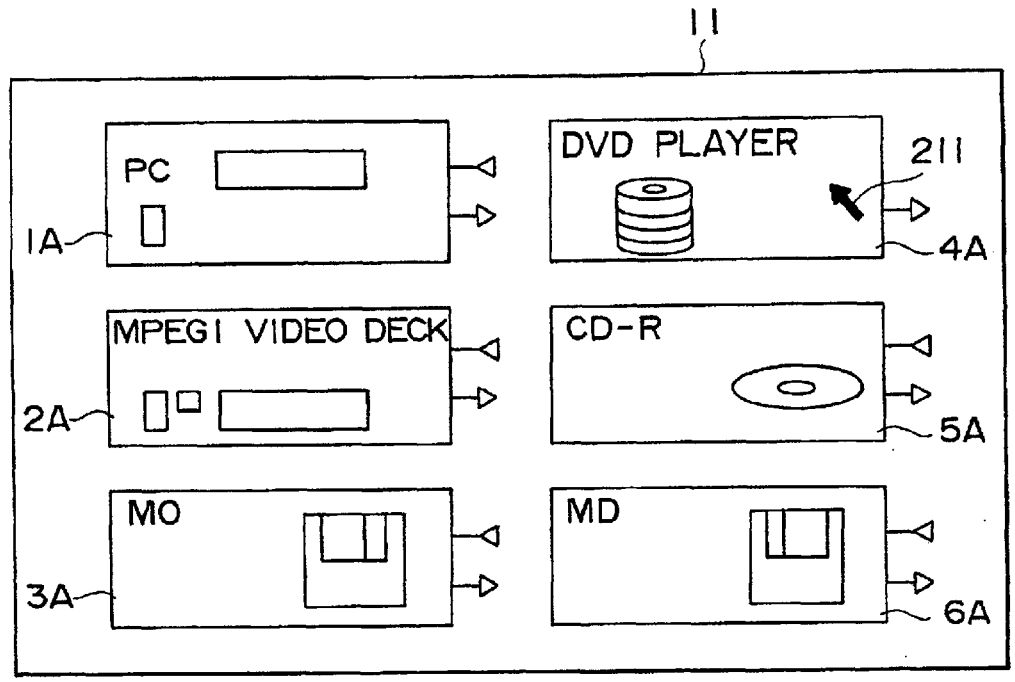
F I G. 19
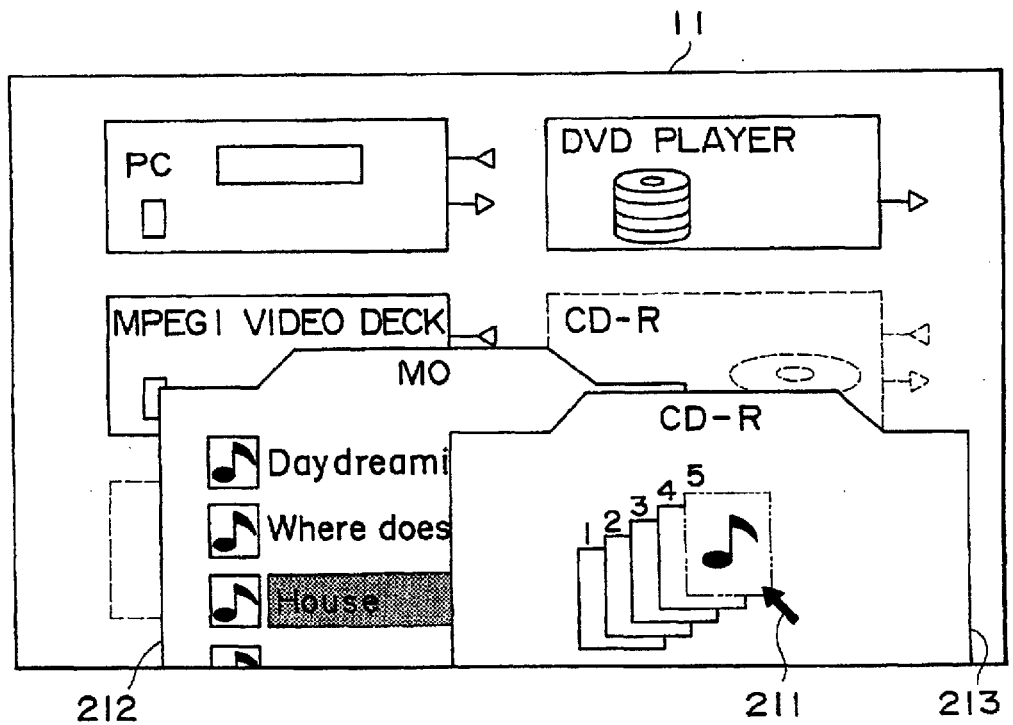

PC MODULE

MO DRIVE MODULE

DVD PLAYER MODULE

MPEG1 VIDEO DECK MODULE

CD-R DRIVE MODULE

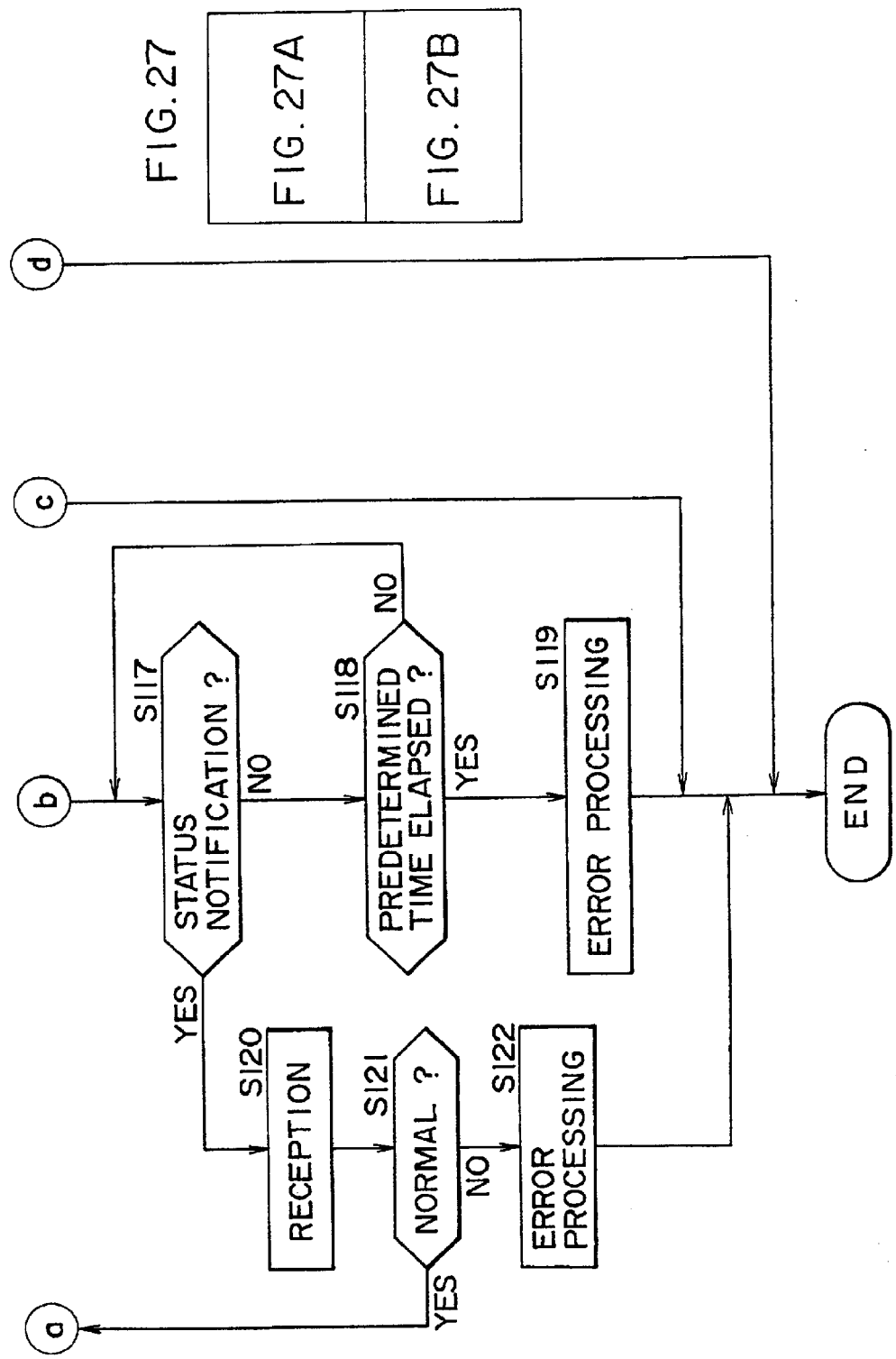

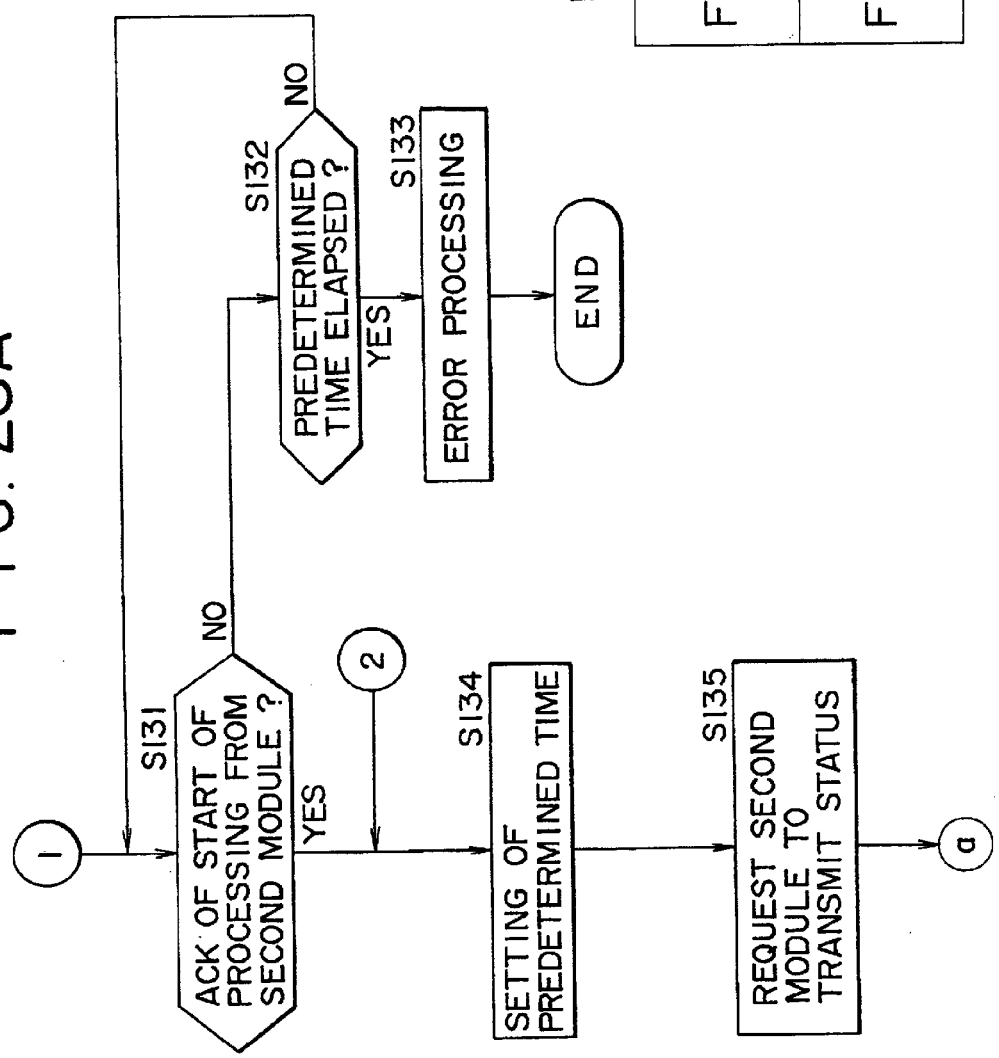

ELECTRONIC EQUIPMENT CONTROLLING APPARATUS AND METHOD, ELECTRONIC EQUIPMENT CONTROLLING SYSTEM AND ELECTRONIC EQUIPMENT

BACKGROUND OF THE INVENTION

This invention relates to an electronic equipment controlling apparatus and method, an electronic equipment controlling system and an electronic equipment, and more particularly to an electronic equipment controlling apparatus and method, an electronic equipment controlling system and an electronic equipment by which function resources of an electronic equipment connected thereto through a communication line can be utilized effectively.

In recent years, utilization not only of AV (Audio Visual) equipments but also of OA (Office Automation) equipments such as a personal computer in a home has been and is increasing. Thus, it seems a possible good idea to connect such AV equipments and a personal computer to each other through a home network or the like so that the AV equipments are controlled by the personal computer.

However, in a related art home network system, in order to control such AV equipments by means of a personal computer, a user must input and set to the personal computer what AV equipments are connected to the personal computer. Consequently, the related art home network system has a subject in that it is low in operability.

Further, the personal computer recognizes each AV equipment as an equipment which outputs one kind of output or as an equipment which outputs one output with respect to one input. As a result, the related art home network system has another subject in that data processed by a plurality of function units individually built in each AV equipment cannot be utilized by another AV equipment.

Now, it is assumed that, for example, as shown in FIG. 29, an MO (Magneto-Optical Disk) equipment 251, a DVD (Digital Video Disk) player module 261 and a CD-R (Compact Disk Recordable) equipment 271 are connected to each other by a bus. Further, it is assumed that predetermined data is recorded in accordance with the MPEG (Moving Picture Experts Group) 2 system on an MO 253 which is driven by an MO drive 252 of the MO equipment 251. It is also assumed that the data is reproduced to produce data of a format of the MPEG 1 system in accordance with standards for a video CD (Compact Disk) and the data thus produced is recorded onto a CD-R 273 which is driven by a CD-R drive 272 of the CD-R equipment 271.

In order to obtain data of the MPEG 1 system, an MPEG 1 encoder is required. since any of the MO equipment 251, DVD player module 261 and CD-R equipment 271 does not have a built-in MPEG 1 encoder, a converter which includes an MPEG 1 encoder must be prepared separately. Thus, it is assumed that a user purchases an MPEG 1 converter 281 which includes an MPEG 1 encoder 282 and connects the MPEG 1 converter 281 to the bus.

First, the MO 253 is reproduced by the MO equipment 251 to obtain data of the MPEG 2 system.

Then, if it is possible to supply the data to an MPEG 2 decoder 264 of the DVD player module 261, then the data is supplied to the MPEG 2 decoder 264, by which the data can be decoded into data of the Motion JPEG (joint Photographic Experts Group) system. Further, the Motion MPEG data is supplied to the MPEG 1 encoder 282 of the MPEG 1 converter 281, by which it is encoded into MPEG 1 data.

Then, the data of the MPEG 1 system is supplied to the CD-R drive 272, by which it can be recorded onto the CD-R 273. The CD-R 273 which conforms with a video CD of the format of the MPEG 1 system can be obtained in this manner.

Actually, however, the DVD player module 261 is constructed such that the MPEG 2 decoder 264 can decode data reproduced from a DVD ROM 263 driven by a DVD-ROM drive 262, but is not constructed such that it can decode external input data by the MPEG 2 decoder 264 and output the resulting data. In other words, the DVD player module 261 is constructed as an equipment of the self-completing type similarly to other AV equipments.

Therefore, after all, for example, as shown in FIG. 30, an MPEG 2 decoder 293 and an MPEG 1 encoder 294 mounted on circuit boards are added to a personal computer (PC) 291 which has a built-in hard disk 292 such that data of the MPEG 2 system outputted from the MO drive 252 is supplied to the MPEG 2 decoder 293 so that it is decoded by the MPEG 2 decoder 293 to obtain data of the Motion MPEG system. Then, the resulting data is supplied to and encoded by the MPEG 1 encoder 294 to obtain data of the MPEG 1 system. Then, the data of the MPEG 1 system is supplied to the CD-R drive 272 of the CD-R equipment 271 so that it is recorded onto the CD-R 273.

In this manner, all functions for data conversion must after all be concentrated upon the personal computer. Consequently, not only the construction of the personal computer 291 is complicated, but also a high cost is required.

SUMMARY OF THE INVENTION

It is an object of the present invention to provide an electronic equipment controlling apparatus and method, an electronic equipment controlling system and an electronic equipment by which a plurality of functions of AV equipments can individually be utilized efficiently and operability is improved while preventing concentration of functions on a personal computer.

In order to attain the object described above, according to an aspect of the present invention, there is provided an electronic equipment controlling apparatus to which one or more electronic equipments are connected by a communication line, comprising communication means for communicating with the electronic equipments through the communication line, control means for requesting each of the electronic equipments for transmission of information of function units included in the electronic equipment and each having at least one of an input and an output, and storage means for storing the information of the function units transmitted from the electronic equipments to the electronic equipment controlling apparatus through the communication line.

According to another aspect of the present invention, there is provided an electronic equipment controlling method for controlling one or more electronic equipments connected by a communication line, comprising a requesting step of requesting each of the electronic equipments for transmission of information of function units included in the electronic equipment and each having at least one of an input and an output, and a storing step of storing the information of the function units transmitted from the electronic equipments through the communication line.

With the electronic equipment controlling apparatus and method, since each of the electronic equipments is requested for transmission of information of function units each having at least one of an input and an output and the information of the function units transmitted from the electronic equipments is stored, the finer functions of the electronic equipments can be utilized effectively.

According to a further aspect of the present invention, there is provided an electronic equipment connected to an electronic equipment controlling apparatus by a communication line, comprising communication means for communicating with the electronic equipment controlling apparatus through the communication line, storage means for storing information of function units included in the electronic equipment and each having at least one of an input and an output, and control means for controlling so that, when a request for transmission of the information of the function units is received from the electronic equipment controlling apparatus, the information of the function units is transmitted to the electronic equipment controlling apparatus.

According to a still further aspect of the present invention, there is provided an electronic equipment controlling method for controlling an electronic equipment connected to an electronic equipment controlling apparatus by a communication line, comprising a receiving step of receiving a request for transmission of information of function units from the electronic equipment controlling apparatus, and a transmitting step of controlling, in response to the request for transmission, to transmit information of function units included in the electronic equipment and each having at least one of an input and an output to the electronic equipment controlling apparatus.

With the electronic equipment and the electronic equipment controlling method, when a request for transmission is received from the electronic equipment controlling apparatus, the stored information of the function units included in the electronic equipment is transmitted to the electronic equipment controlling apparatus. Consequently, any function of the electronic equipment can be utilized effectively.

According to a yet further aspect of the present invention, there is provided an electronic equipment controlling system, comprising a plurality of first electronic equipments connected to each other by a communication line, and a second electronic equipment for controlling the first electronic equipments, each of the first electronic equipments including first communication means for communicating with the second electronic equipment through the communication line, first storage means for storing information of function units included in the first electronic equipment and each having at least one of an input and an output, and first control means for controlling so that, when a request for transmission of the information of the function units is received from the second electronic equipment, the information of the function units is transmitted to the second electronic equipment, the second electronic equipment including second communication means for communicating with the first electronic equipments through the communication line, second control means for requesting each of the first electronic equipments for transmission of the information of the function units of the first electronic equipment, and second storage means for storing the information of the function units transmitted from the first electronic equipments to the second electronic equipment through the communication line.

According to a yet further aspect of the present invention, there is provided an electronic equipment controlling method for an electronic equipment controlling system which includes a plurality of first electronic equipments connected to each other by a communication line, and a second electronic equipment for controlling the first electronic equipments, comprising a requesting step by the second electronic equipment of requesting each of the first electronic equipments for transmission of information of function units included in the first electronic equipment and each of having at least one of an input and an output, a receiving step by each of the first electronic equipments of receiving the request for transmission of information of function units from the second electronic equipment, a transmitting step by each of the first electronic equipments of controlling in response to the request for transmission so that the information of the function units of the first electronic equipment is transmitted to the second electronic equipment, and a storing step by the second electronic equipment of storing the information of the function units transmitted from the first electronic equipments through the communication line.

With the electronic equipment controlling system and method, when a request is received from the second electronic equipment, the information of the function units of the first electronic equipments is transmitted to and stored into the second electronic equipment. Consequently, the functions of the electronic equipments of the entire network can be utilized effectively. As a result, the electronic equipments can be simplified in construction.

According to a yet further aspect of the present invention, there is provided an electronic equipment controlling apparatus to which a plurality of electronic equipments are connected by a communication line, comprising control means for producing, based on an order of processes to be executed by the electronic equipments, commands including information of contents of the processes and designation information for designating that one of the electronic equipments by which the processes are to be executed next, and communication means for outputting the produced commands to the electronic equipments through the communication line.

According to a yet further aspect of the present invention, there is provided an electronic equipment controlling method for an electronic equipment controlling apparatus to which a plurality of electronic equipments are connected by a communication line, comprising a controlling step of producing, based on an order of processes to be executed by the electronic equipments, commands including information of contents of the processes and designation information for designating that one of the electronic equipments by which the processes are to be executed next, and a communicating step of outputting the produced commands to the electronic equipments through the communication line.

With the electronic equipment controlling apparatus and method, since each of the electronic equipments produces, after it performs predetermined processing, commands including designation information for designating that one of the electronic equipments by which processing is to be performed next, the load when to control the plurality of electronic equipments can be reduced.

According to a yet further aspect of the present invention, there is provided an electronic equipment connected to an electronic equipment controlling apparatus by a communication line, comprising communication means for communicating with the electronic equipment controlling apparatus through the communication line, processing means for performing, when commands including information of contents of processes to be executed by a plurality of electronic equipments based on an order of the processes and designation information for designating that one of the electronic equipments by which the processes are to be executed next are received from the electronic equipment controlling apparatus, a process corresponding to one of the commands which is destined for the electronic equipment, and outputting means for adding, after the process corresponding to the command is completed, data obtained by the process to at least part of the commands from the electronic equipment controlling apparatus and outputting the resulting commands to another one of the electronic equipments.

According to a yet further aspect of the present invention, there is provided an electronic equipment controlling method performed by an electronic equipment connected to an electronic equipment controlling apparatus by a communication line, comprising a processing step of performing, when commands including information of contents of processes to be executed by a plurality of electronic equipments based on an order of the processes and designation information for designating that one of the electronic equipments by which the processes are to be executed next are received from the electronic equipment controlling apparatus, a process corresponding to one of the commands which is destined for the electronic equipment, and an outputting step of adding, after the process corresponding to the command is completed, data obtained as a result of the process to at least part of the commands from the electronic equipment controlling apparatus and outputting the resulting commands to another one of the electronic equipments.

With the electronic equipment and the electronic equipment controlling method, when processing corresponding to a command is completed, data obtained as a result of the processing is added to the commands from the electronic equipment controlling apparatus and the resulting commands are outputted to a next one of the electronic equipments. Consequently, the electronic equipment can cooperate with another electronic equipment rapidly and with certainty to perform processing of information.

According to a yet further aspect of the present invention, there is provided an electronic equipment controlling system, comprising a plurality of first electronic equipments connected to each other by a communication line, and a second electronic equipment for controlling the first electronic equipments, each of the first electronic equipments including first communication means for communicating with the second electronic equipment through the communication line, processing means for performing, when commands including information of contents of processes to be executed by a plurality of electronic equipments based on an order of the processes and designation information for designating that one of the electronic equipments by which the processes are to be executed next are received from the second electronic equipment, a process corresponding to one of the commands which is destined for the electronic equipment, and outputting means for adding, after the process corresponding to the command is completed, data obtained as a result of the process to at least part of the commands from the second electronic equipment and outputting the resulting commands to another one of the electronic equipments, the second electronic equipment including control means for producing, based on the order of the processes to be executed by the electronic equipments, commands including information of contents of the processes and designation information for designating that one of the electronic equipments by which the processes are to be executed next, and second communication means for outputting the produced commands to the electronic equipments through the communication line.

According to a yet further aspect of the present invention, there is provided an electronic equipment controlling method for an electronic equipment controlling system which includes a plurality of first electronic equipments connected to each other by a communication line, and a second electronic equipment for controlling the first electronic equipments, comprising a controlling step by the second electronic equipment of producing, based on an order of processes to be executed by a plurality of electronic equipments, commands including information of contents of the processes and designation information for designating that one of the electronic equipments by which the processes are to be executed next, a communicating step by the second electronic equipment of outputting the produced commands to the electronic equipments through the communication line, a processing step by each of the first electronic equipments of performing, when the commands are received from the second electronic equipment, a process corresponding to one of the commands which is destined for the first electronic equipment, and an outputting step by each of the first electronic equipments of adding, after the process corresponding to the command is completed, data obtained as a result of the process to at least part of the commands from the second electronic equipment and outputting the resulting commands to another one of the electronic equipments.

With the electronic equipment controlling system and method, after predetermined processing is performed by any of the first electronic equipments, commands which include designation information for designating that one of the electronic equipments by which processing is to be performed next are produced by the second electronic equipment, and then, when the commands are received by the first electronic equipment, the first electronic equipment adds the commands from the second electronic equipment to data obtained as a result of processing corresponding to one of the commands destined for the first electronic equipment and outputs the resulting commands. Consequently, the plurality of first electronic equipments of the entire network can cooperate with each other to perform processing of information rapidly and with certainty.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 11 is a table illustrating information of function units of the MPEG 1 video deck module of FIG. 5;

FIG. 12 is a table illustrating information of function units of the MO drive module of FIG. 6;

FIG. 13 is a table illustrating information of function units of the DVD player module of FIG. 7;

FIG. 14 is a table illustrating information of function units of the CD-R drive module of FIG. 8;

FIG. 15 is a table illustrating information of function units of an MD drive module shown in FIG. 1;

FIGS. 16A, 16B and 17 are flowcharts illustrating operation of the PC module of FIG. 3;

FIG. 18 is a schematic illustration showing an example of a display of an equipment selection menu;

FIG. 19 is a schematic illustration showing an example of a display when an equipment is selected;

FIGS. 28 and 28B are flowcharts illustrating a further example of processing of the PC module shown in FIG. 1;

DESCRIPTION OF THE PREFERRED EMBODIMENT

Figure 1:
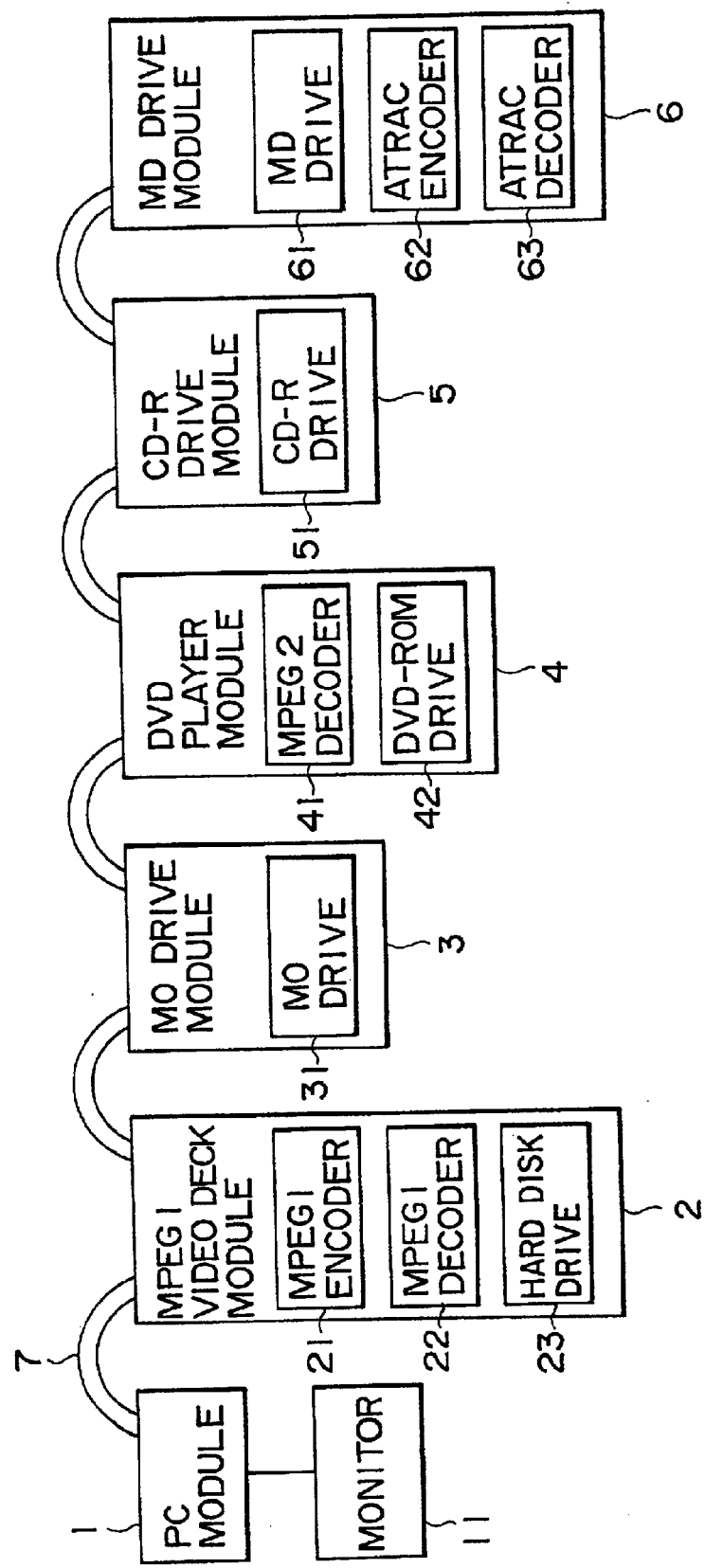
FIG. 1 is a block diagram showing an example of a construction of an AV system to which the present invention is applied.

Referring first FIG. 1, there is shown an example of a construction of an AV system to which the present invention is applied. In the construction example shown, a PC module 1 which functions as a computer is successively connected to an MPEG (Moving Picture Experts Group) 1 video deck module 2, an MO (Magneto-Optical) drive module 3, a DVD (Digital Video Disk) player module 4, a CD-R (Compact Disk-Recordable) drive module 5 and an MD (Mini Disk) drive module 6 by an IEEE 1394 cable system (hereinafter referred to simply as 1394 cable) 7 based on the IEEE (Institute of Electrical and Electronics Engineers) 1394 serial bus standards. Further, a monitor 11 is connected to the PC module 1 so that a predetermined image may be displayed on the monitor 11.

The MPEG 1 video deck module 2 includes an MPEG 1 encoder 21, an MPEG 1 decoder 22 and a hard disk drive 23 built therein such that data supplied thereto from any other module c an be encoded by the MPEG 1 encoder 21 and recorded onto a hard disk by the hard disk drive 23. On the other hand, data reproduced from the hard disk by the hard disk drive 23 can be decoded by the MPEG 1 decoder 22 and outputted from the MPEG 1 video deck module 2.

The MO drive module 3 includes an MO drive 31 built therein such that data is recorded onto an MO loaded in the MO drive 31 whereas the data is reproduced from the MO and the reproduced data is outputted from the MO drive module 3. The DVD player module 4 drives a DVD-ROM loaded therein by means of a DVD-ROM drive 42, decodes the data reproduced from the DVD-ROM by means of an MPEG 2 decoder 41 and outputs the decoded data.

The CD-R drive module 5 drives a CD-R or a CD-ROM by means of a CD-R drive 51 and outputs data recorded on the CD-R or CD-ROM whereas it can record data inputted from the outside onto the CD-R.

The MD drive module 6 drives an MD loaded therein by means of an MD drive 61, decodes a reproduced signal from the MD by means of an ATRAC decoder 63 and outputs the decoded signal to the outside. Further, the MD drive module 6 can encode data inputted thereto from the outside by means of an ATRAC encoder 62 and record the encoded data onto the MD.

Figure 2:
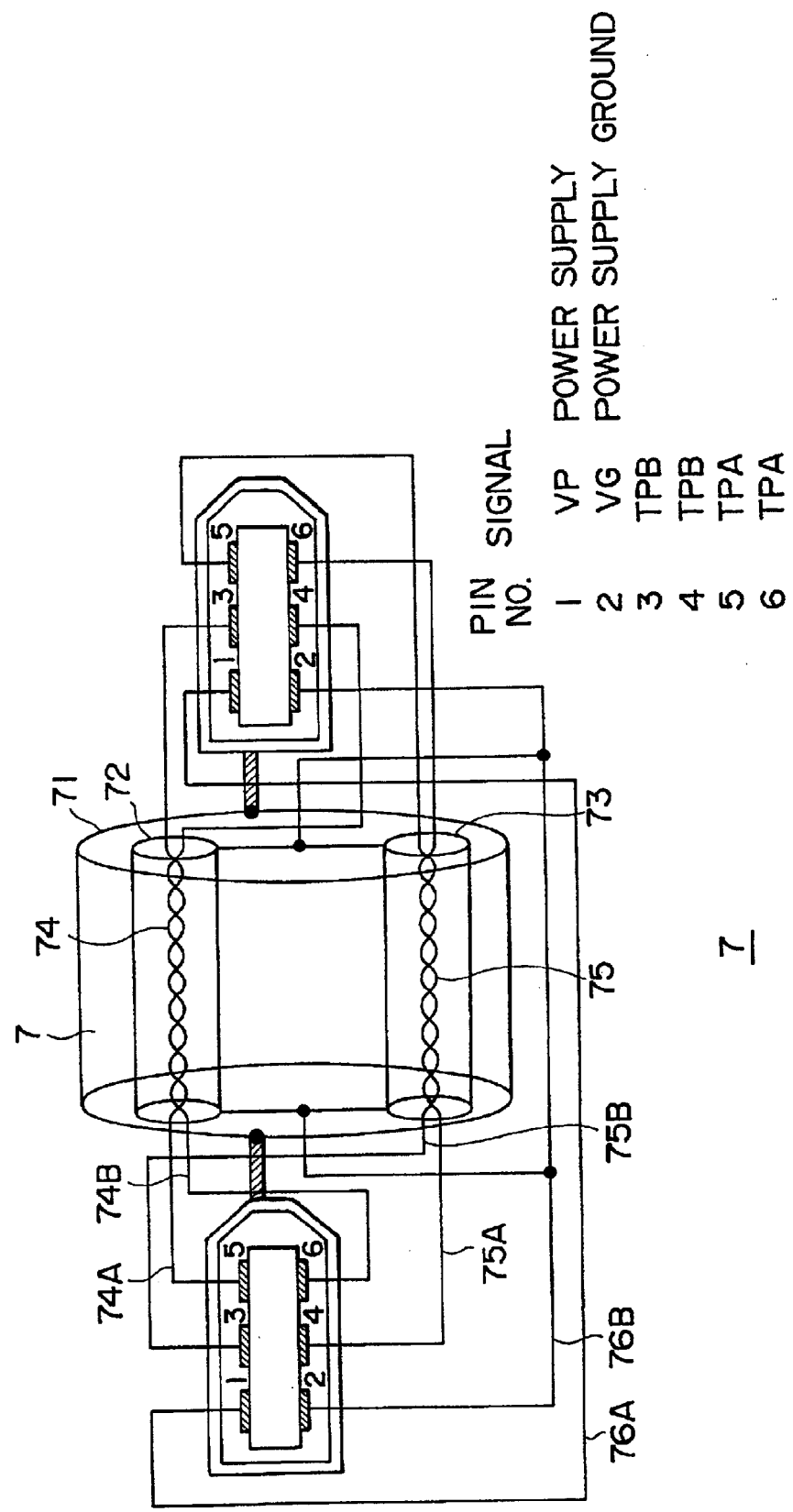
FIG. 2 is a diagrammatic view illustrating a construction of a 1394 cable shown in FIG. 1.

FIG. 2 shows a detailed construction of the 1394 cable. Referring to FIG. 2, the 1394 cable 7 includes an outer tubular member 71, and an inner tubular member 72 and another inner tubular member 73 provided in the inside of the outer tubular member 71. A stranded wire 74 composed of a wire 74A and another wire 74B is disposed in the inside of the inner tubular member 72 while another stranded wire 75 composed of a wire 75A and another wire 75B is disposed in the inside of the inner tubular member 73. The stranded wire 74 and the stranded wire 75 form signal paths which are independent of each other. Meanwhile, a wire 76A and another wire 76B are disposed outside the outer tubular member 71 so that power may be supplied therethrough.

In this manner, the PC module 1 supplies and receives control signals, video signals and audio signals to and from the MPEG 1 video deck module 2, MO drive module 3, DVD player module 4, CD-R drive module 5 and MD drive module 6, which are formed as AV equipments having functions conforming to the IEEE 1394 standards, through the 1394 cable 7.

Figure 3:
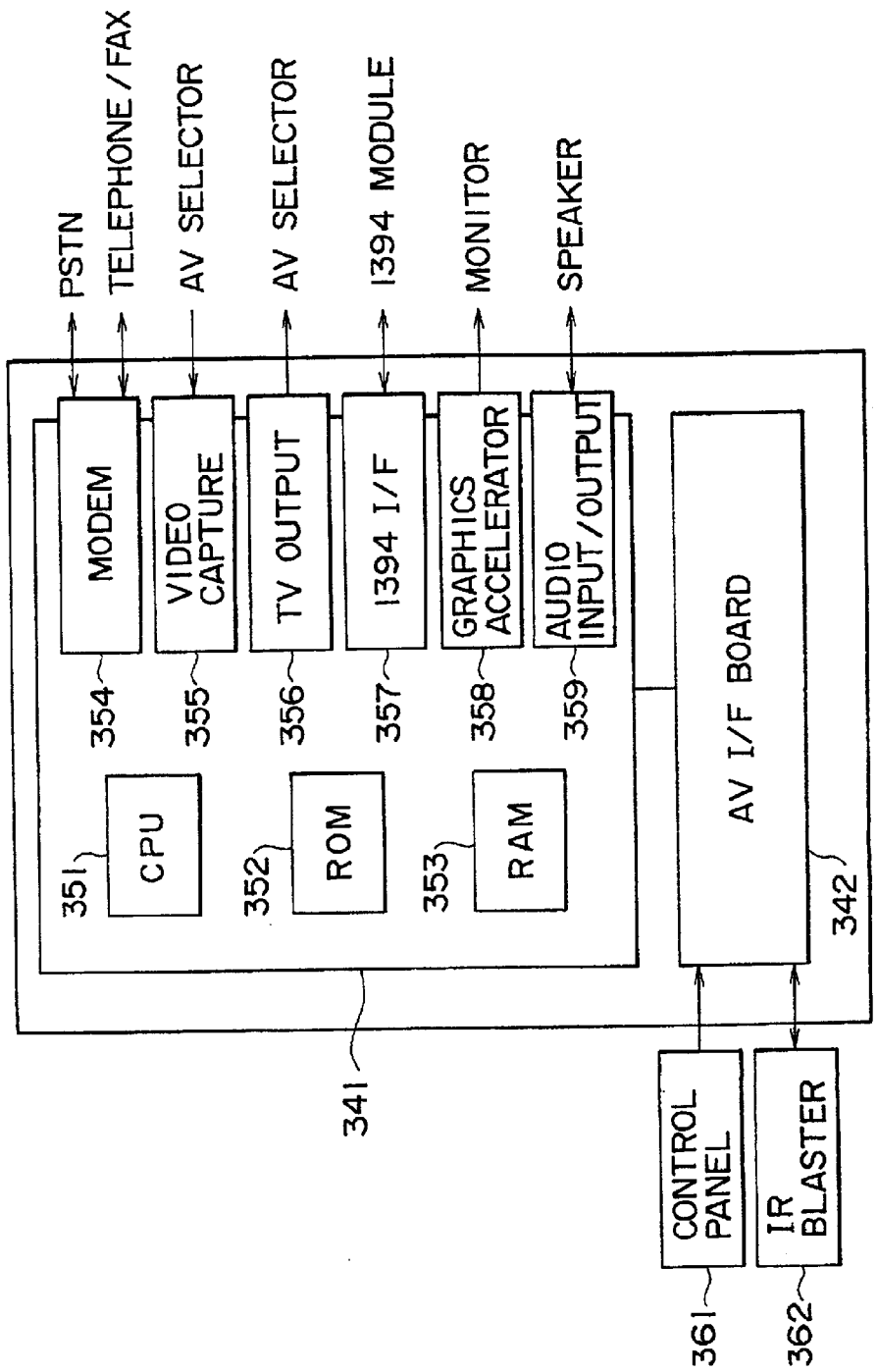
FIG. 3 is a block diagram showing a construction of a PC module shown in FIG. 1.

FIG. 3 shows an example of an internal construction of the PC module 1. Referring to FIG. 3, the PC module 1 includes a mother board 341 and an AV interface (I/F) board 342. Various parts which cooperatively function as a personal computer are mounted on the mother board 341. In particular, the mother board 341 includes a CPU (Central Processing Unit) 351 which executes various processes, a ROM (Read Only Memory) 352 in which programs necessary for the CPU 351 to execute various processes are stored, and a RAM (Random Access Memory) 353 for suitably storing data and so forth necessary for the CPU 351 to execute various processes.

The mother board 341 further has a modem 354 mounted thereon, which is either connected directly to a public switched telephone network (PSTN) or connected to a telephone set or a facsimile apparatus not shown. The modem 354 executes communication through the telephone network. A video capture 355 receives an input of a video signal from an AV selector module not shown and processes the received video signal. A TV output 356 outputs a video signal from the mother board 341 to the AV selector module.

A 1394 interface (I/F) 357 of the mother board 341 is connected to another AV equipment (in the present embodiment, to the MPEG 1 video deck module 2) through the 1394 cable 7. The 1394 interface 357 processes data communicated through the 1394 cable 7. A graphics accelerator 358 produces graphics data and outputs the graphics data to the monitor 11 so that it may be displayed on the monitor 11. Meanwhile, an audio input/output 359 outputs an audio signal from the mother board 341 to a loudspeaker (not shown) provided in the monitor 11.

A control panel 361 and an IR (Infrared) blaster 362 are connected to the AV interface board 342. The AV interface board 342 controls the mother board 341 in response to an input from the control panel 361 or the IR blaster 362.

Figure 4:
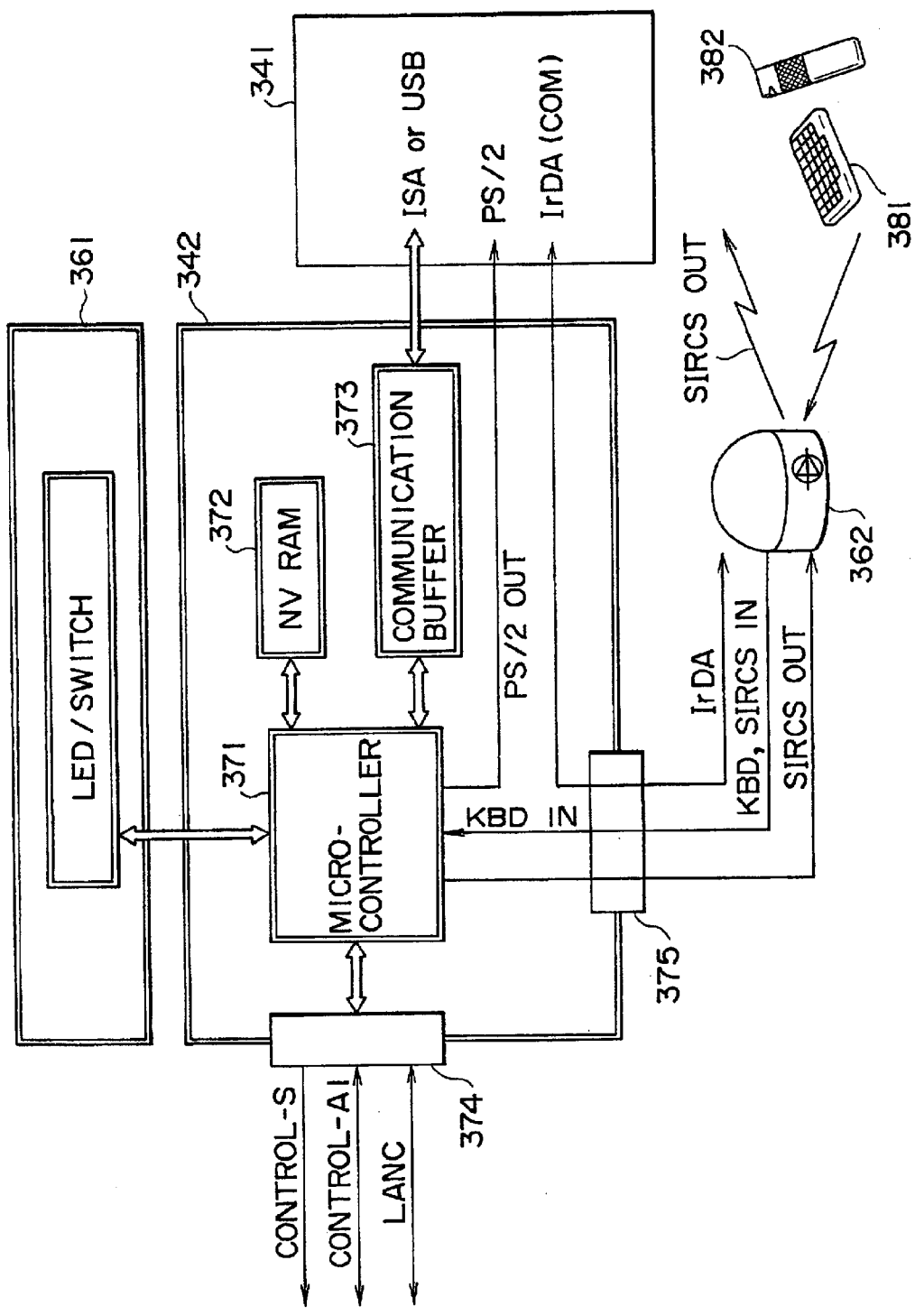
FIG. 4 is a block diagram showing a construction of an AV interface board shown in FIG. 3.

FIG. 4 shows an example of a more detailed construction of the AV interface board 342. Referring to FIG. 4, the AV interface board 342 includes a microcontroller 371 and executes various processes in response to inputs from various switches of the control panel 361. The microcontroller 371 also controls lighting of an LED of the control panel 361. An NVRAM (Non-Volatile Random Access Memory) 372 stores data and so forth which are required to be kept stored also after power supply to the microcontroller 371 is stopped. A communication buffer 373 is connected to an ISA (Industry Standard Architecture) or a USB (Universal Serial Bus) as an expansion slot of the mother board 341 and temporarily buffers data to be communicated between the microcontroller 371 and the mother board 341. Further, the microcontroller 371 outputs a signal based on the PS/2 (Personal System 2) (trademark) standards to the mother board 341. Generally, the PS/2 is standards used as an interface for connecting a mouse or a keyboard to a computer.

The IR blaster 362 receives an infrared signal outputted from an infrared keyboard (wireless keyboard) 381 or a remote commander 382, converts the infrared signal into an electric signal and outputs the electric signal as a KBD signal to the microcontroller 371 through a terminal 375. The KBD signal is a signal representative of a key code received from the infrared keyboard 381. The microcontroller 371 converts the key code KBD signal produced by the infrared keyboard into a PS/2 signal mentioned above and transfers the PS/2 signal to the mother board 341. Consequently, the mother board 341 can recognize a signal from the infrared keyboard similarly to that from a keyboard which is normally connected by a wire. Meanwhile, the IR blaster 362 receives an input of a control signal based on the SIRCS (Standard Code for Infrared Remote Control Systems) (trademark) standards from the microcontroller 371 through the terminal 375 and outputs the control signal as an infrared signal. The SIRCS signal is a command signal generated by the remote commander 382 for controlling an AV equipment or the like. The microcontroller 371 converts the SIRCS signal received from the remote commander 382 into a control signal (control signal based on an AV protocol of the control S, control Al, LANC or IEEE 1394), and transmits the control signal to a corresponding AV equipment. The microcontroller 371 transfers a control signal for controlling an AV equipment to the mother board 341 through a terminal 374 or a communication buffer 373, and the mother board 341 transmits the control signal to the corresponding AV equipment through the 1394 interface 357. Consequently, the microcontroller 371 can control the AV equipment connected to the PC module 1 in accordance with the control signal for the AV equipment received from the remote commander 382. Meanwhile, the AV interface board 342 communicates a signal based on the IrDa (Infrared Data Association) standards between the mother board 341 and the IR blaster 362, and the mother board 341 can transfer data to another personal computer or AV equipment by infrared rays using the IrDa signal.

Control signals based on the control S, control Al and LANC standards are inputted to or outputted from the terminal 374 of the AV interface board 342.

Figure 5:
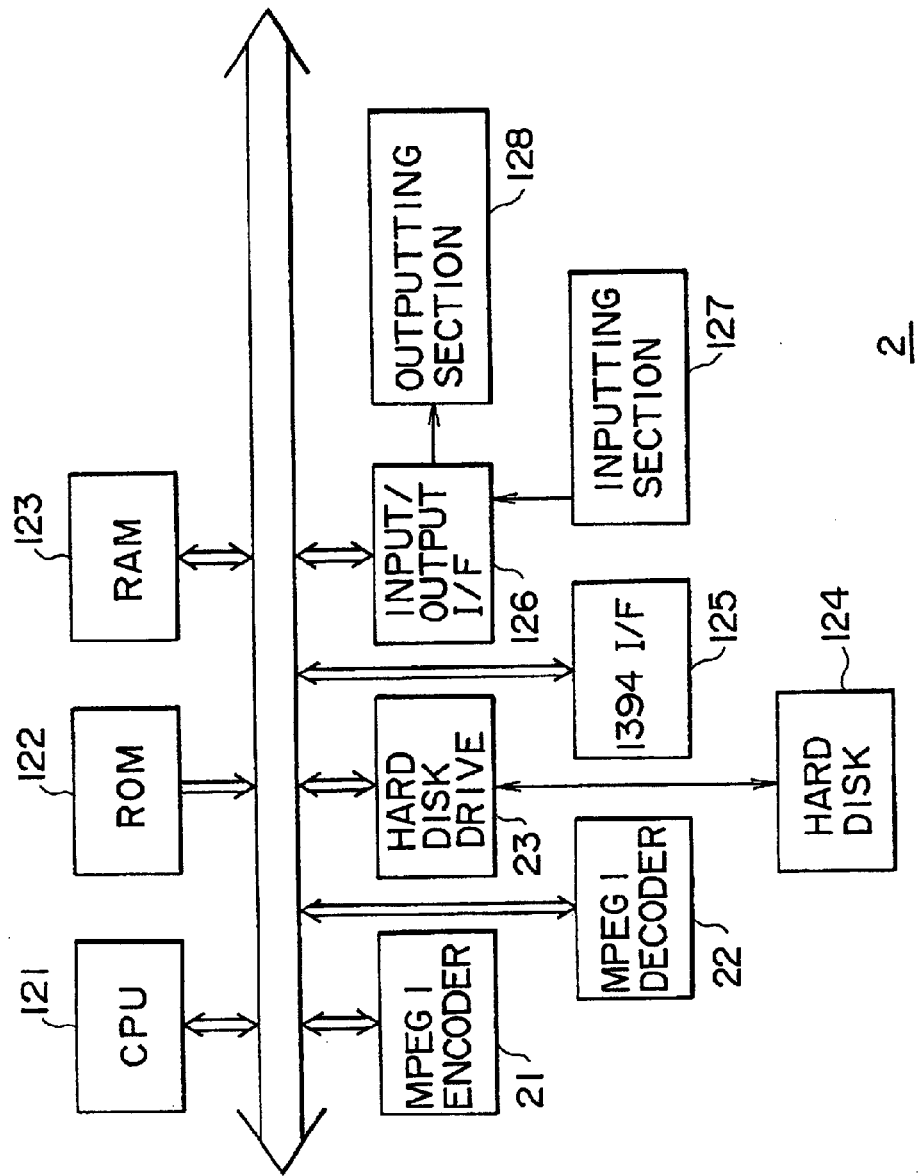
FIG. 5 is a block diagram showing a construction of an MPEG 1 video deck module shown in FIG. 1.

FIG. 5 shows an example of an internal construction of the MPEG 1 video deck module 2. A CPU 121 executes various processes in accordance with a program stored in a ROM 122. Data necessary for the CPU 121 to execute various processes are stored suitably into a RAM 123. Data encoded by the MPEG 1 encoder 21 is recorded onto a hard disk 124 which is driven by the hard disk drive 23. On the other hand, data read out from the hard disk 124 is decoded by the MPEG 1 decoder 22 and then outputted from a 1394 interface 125 to the 1394 cable 7. Or else, the data is outputted to an outputting section 128 through an input/output interface 126. An inputting section 127 is manually operated in order to input various instructions, and an inputted instruction is supplied to the CPU 121 through the input/output interface 126.

Figure 6:
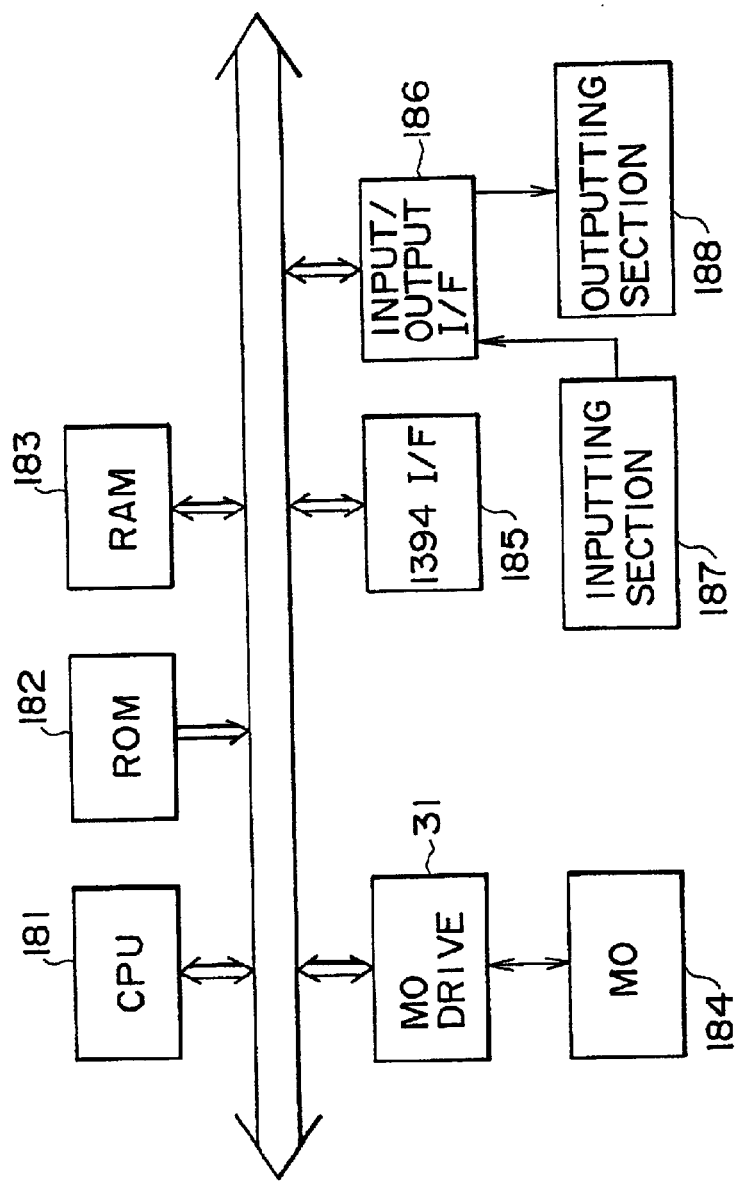
FIG. 6 is a block diagram showing a construction of an MO drive module shown in FIG. 1.

FIG. 6 shows an example of an internal construction of the MO drive module 3. A CPU 181 executes various processes in accordance with a program stored in a ROM 182. A RAM 183 suitably stores data necessary for the CPU 181 to execute various processes. The MO drive 31 drives an MO 184 to record data onto or reproduced recorded data from the MO 184 and outputs the reproduced data to the 1394 cable 7 through a 1394 interface 185 or to an outputting section 188 through an input/output interface 186. An inputting section 187 is manually operated in order to input various instructions, and an inputted instruction is inputted to the CPU 181 through the input/output interface 186.

Figure 7:
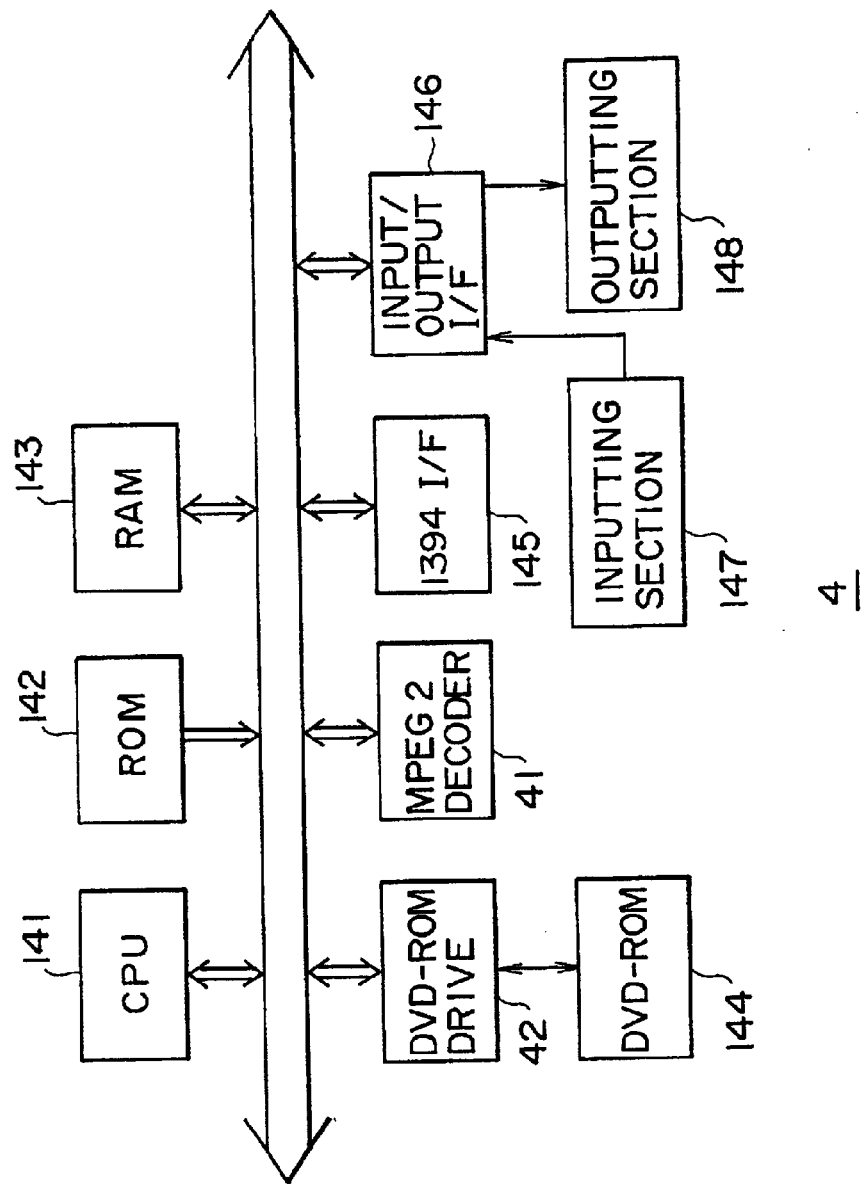
FIG. 7 is a block diagram showing a construction of a DVD player module shown in FIG. 1.

FIG. 7 shows an example of an internal construction of the DVD player module 4. Referring to FIG. 7, in the present construction example, a CPU 141 executes various processes in accordance with a program stored in a ROM 142. A RAM 143 suitably stores data necessary for the CPU 141 to execute various processes. The DVD-ROM drive 42 drives a DVD-ROM 144 to reproduce data recorded on the DVD-ROM 144 and supplies the reproduced data to the MPEG 2 decoder 41. The MPEG 2 decoder 41 decodes the data inputted thereto and outputs the decoded data to the 1394 cable 7 through a 1394 interface 145 or to an outputting section 148 through a input/output interface 146. An inputting section 147 is manually operated in order to input various instructions, and an inputted instruction is inputted to the CPU 141 through the input/output interface 146.

Figure 8:
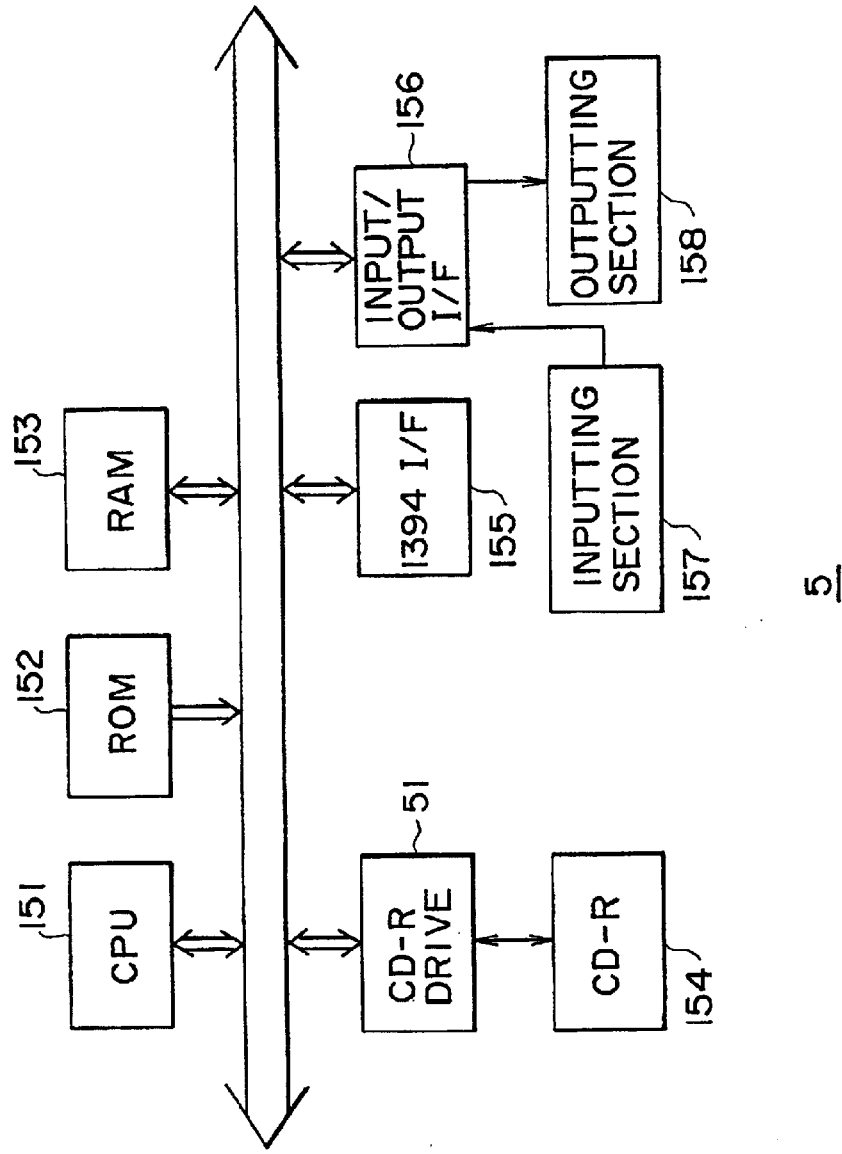
FIG. 8 is a block diagram showing a construction of a CD-R drive module shown in FIG. 1.

FIG. 8 shows an example of an internal construction of the CD-R drive module 5. Referring to FIG. 8, a CPU 151 executes various processes in accordance with a program stored in a ROM 152. A RAM 153 suitably stores data necessary for the CPU 151 to execute various processes. The CD-R drive 51 drives a CD-R 154 or a CD-ROM to record data onto the CD-R 154 or reproduce data recorded on the CD-R 154 and outputs the reproduced data to the 1394 cable 7 through a 1394 interface 155 or to an outputting section 158 through an input/output interface 156. An inputting section 157 is manually operated in order to input various instructions, and an inputted instruction is inputted to the CPU 151 through the input/output interface 156.

Figure 9:
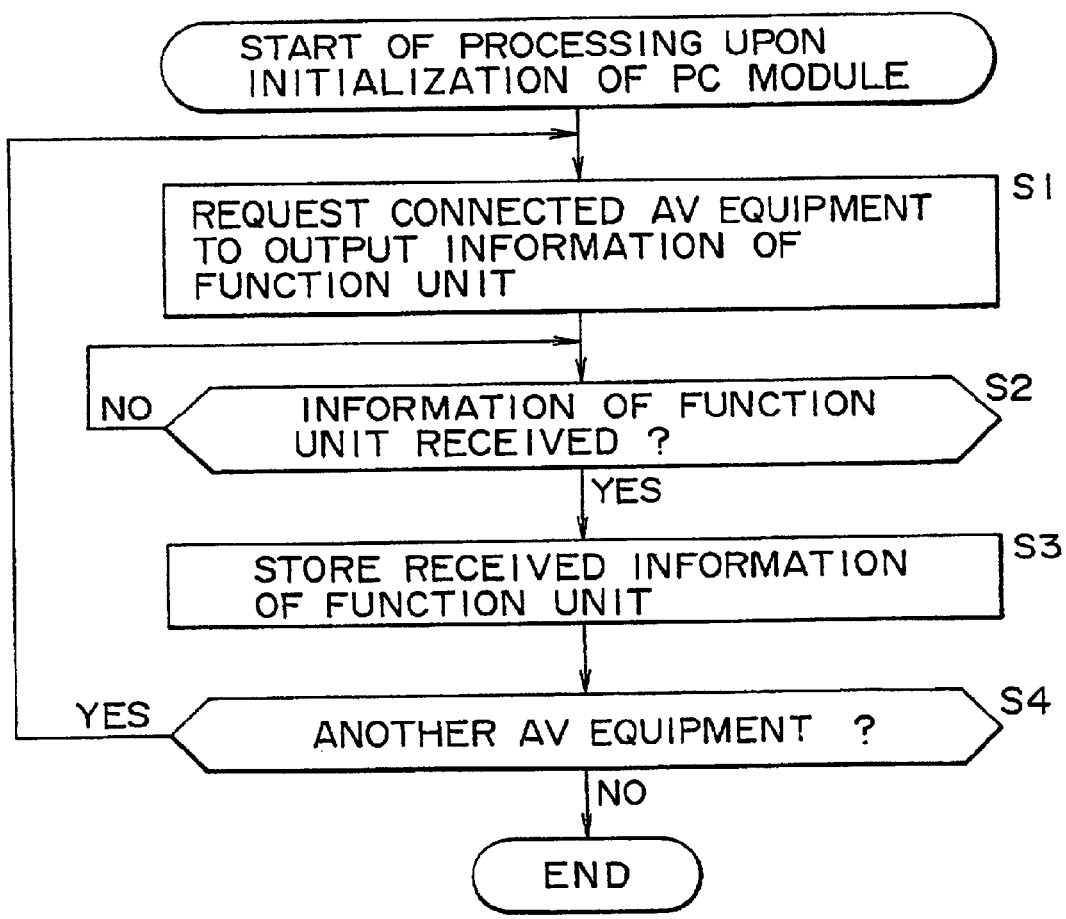
FIG. 9 is a flow chart illustrating processing of the PC module of FIG. 3 upon initialization.

Subsequently, processing (upon initialization) when power supply to the PC module 1 is switched on is described with reference to a flow chart of FIG. 9. First in step S1, the CPU 351 of the PC module 1 requests one of AV equipments connected to the 1394 cable 7 (in the embodiment of FIG. 1, one of the MPEG 1 video deck module 2, MO drive module 3, DVD player module 4, CD-R drive module 5 and MD drive module 6) to output information of function units.

Figure 10:
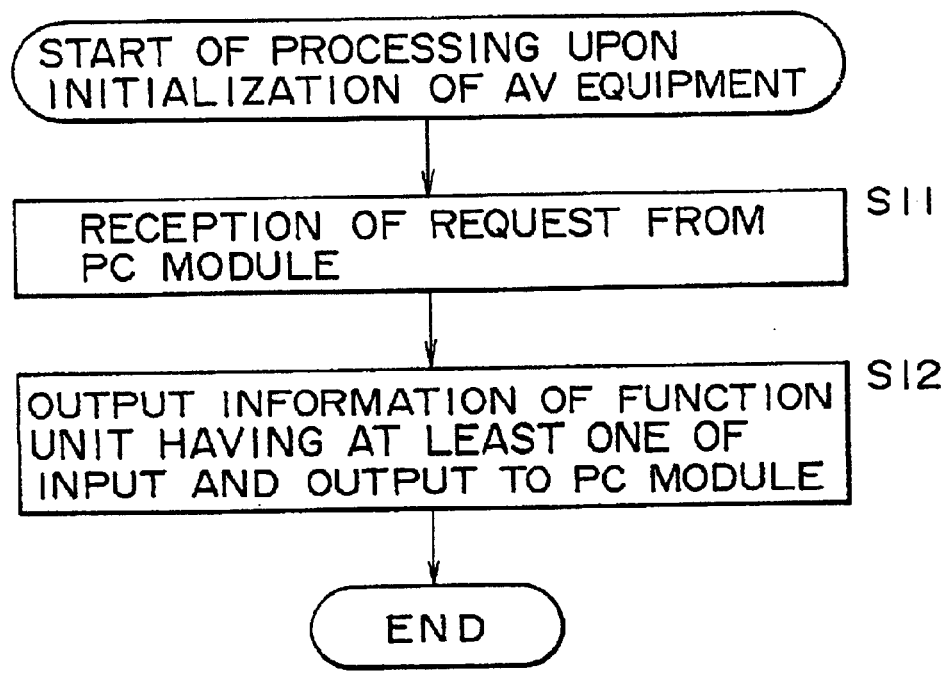
FIG. 10 is a flow chart illustrating processing of the AV equipments shown in FIG. 1 upon initialization.

That one of the AV equipments which receives the request reads out, in step S12, information of function units from the ROM built therein as hereinafter described with reference to FIG. 10 and transmits the information of function units to the PC module 1 through the 1394 cable 7. The information of function units which is transmitted in this instance is hereinafter described with reference to FIGS. 11 to 15.

The CPU 351 of the PC module 1 waits, in step S2, until information of function units is transmitted thereto from the predetermined AV equipment. If information of function units is transmitted to the PC module 1, then the information is received by the 1394 interface 357. When the information of function units is received, the CPU 351 stores the information of function units into the RAM 353 through the 1394 interface 357 in step S3. Then, the control advances to step S4, in which it is discriminated whether or not there remains any AV equipment from which information of function units has not been supplied to the PC module 1, and if such AV equipment remains, then the control returns to step S1, in which similar processing is executed. In this manner, the PC module 1 receives supply of information of function units of the individual AV equipments from all of the AV equipments connected to the 1394 cable 7. If it is discriminated in step S4 that supply of information of function units is received from all of the AV equipments, then the initialization processing is completed.

It is to be noted that, while, in the example described above, the PC module 1 performs initialization processing when power supply to the PC module 1 is made available, the timing at which the initialization processing is executed is not limited to this particular timing. For example, based on the program stored in the RAM 353, the CPU 351 may execute, after each predetermined time, the initialization processing described above for the AV equipments on the bus connected to each other by the 1394 cable 7.

Further, the IEEE 1394 serial bus allows connection of a new electronic equipment thereto without disconnecting the power supply to the electronic equipments connected already thereto. Upon such connection, setting on the bus is reset and bus initialization processing (bus resetting) is performed. The PC module 1 may execute, when it is detected that such bus resetting has been performed, the initialization processing illustrated in the flow chart of FIG. 9 after the bus resetting.

By the construction just described, the AV equipments connected to the PC module 1 including an AV equipment newly connected to the 1394 serial bus after power supply to the PC module 1 is made available can be controlled by the PC module 1 without performing re-closing of power supply to the PC module 1.

Subsequently, operation upon initialization of each AV equipment is described with reference to a flow chart of FIG. 10. First in step S11, for example, the CPU 121 of the MPEG 1 video deck module 2 receives a request outputted in step S1 from the PC module 1 through the 1394 interface 125. When the request is received, the control advances to step S12, in which the CPU 121 reads out the information of the function units stored in the ROM 122 and outputs the information of the function units to the PC module 1 through the 1394 interface 125 and the 1394 cable 7. The CPU 351 of the PC module 1 receives the information of the function units in step S2 as described above and stores the information of the function units into the RAM 353 in step S3. FIG. 11 illustrates an example of information of function units outputted from the MPEG 1 video deck module 2. It is to be noted that the information of function units here signifies information of units of functions each of which at least has an input or an output, and the MPEG 1 video deck module 2 has, as such function units, the MPEG 1 encoder 21, MPEG 1 decoder 22 and hard disk drive 23.

The input format of the MPEG 1 encoder 21 is a format prescribed by the Motion JPEG (Joint Photographic Experts Group), and the output format of the MPEG 1 encoder 21 is a format prescribed by the MPEG 1. The input format of the MPEG 1 decoder 22 is a format prescribed by the MPEG 1 while the output format of the MPEG 1 decoder 22 is a format prescribed by the Motion JPEG format. The input format and the output format of the hard disk drive 23 may both be an arbitrary format only if digital data are handled.

In the ROM 122 of the MPEG 1 video deck module 2, such information of function units as illustrated in FIG. 11 is stored in advance, and the information of the function units is transmitted to the PC module 1 in such a manner as described above.

The MO drive module 3 has the MO drive 31, and the input and output formats of the MO drive 31 are prescribed as digital data as seen in FIG. 12. The information of the function unit is stored in the ROM 182 of the MO drive module 3.

FIG. 13 illustrates information of function units stored in the ROM 142 of the DVD player module 4. As an input format of the MPEG 2 decoder 41, the format of the MPEG 2 is prescribed, and as an output format of the MPEG 2 decoder 41, the format of the Motion JPEG is prescribed. Meanwhile, the input format of the DVD-ROM drive 42 is not prescribed since the DVD-ROM drive 42 cannot effect recording, and the output format of the DVD-ROM drive 42 is prescribed as digital data.

FIG. 14 illustrates information of function units stored in the ROM 152 of the CD-R drive module 5. The input format and the output format of the CD-R drive 51 are both prescribed as digital data.

FIG. 15 illustrates information of function units of the MD drive module 6. The input format and the output format of the MD drive 61 are both prescribed as digital data. The input format of the ATRAC encoder 62 is prescribed as PCM (Pulse Code Modulation) data, and the output format is prescribed as ATRAC (Adaptive Transform Acoustic Coding). Meanwhile, the input format of the ATRAC encoder 62 is prescribed as ATRAC while the output format is prescribed as PCM data.

Processing when a user controls the AV equipments through the PC module 1 after processing (initialization processing) of storing such information of function units as illustrated in FIGS. 11 to 15 into the RAM 353 of the PC module 1 is executed by such initialization processing as described above is described subsequently with reference to flow charts of FIGS. 16 and 17.

If the user manually operates a predetermined key of the infrared keyboard 381 to input an instruction to display an AV equipment selection menu in step S21, then an infrared signal corresponding to the operated key is inputted to the IR blaster 362. The IR blaster 362 converts the infrared signal into an electric signal and outputs the electric signal to the microcontroller 371. The microcontroller 371 outputs a signal corresponding to the thus inputted signal to the CPU 351 of the PC module 1.

If the user inputs the equipment selection menu displaying instruction in this manner, then the CPU 351 executes equipment selection menu displaying processing in step S22. In particular, as described hereinabove, upon initialization processing, information of function units is supplied from the individual AV equipments to the PC module 1 and stored into the RAM 353 of the PC module 1. The CPU 351 reads out the information of the function units stored in the RAM 353 and causes the graphics accelerator 358 to produce graphical user interface (GUI) data corresponding to the information of the function units. Then, an image of the thus produced GUI is outputted to the monitor 11 so that it is displayed on the monitor 11.

In this manner, for example, as seen in FIG. 18, icon graphic forms 1A to 6A corresponding to the AV equipments connected to the 1394 cable 7 are displayed on the monitor 11. Each of the icon graphic forms 1A to 6A has applied thereto a graphic form or forms which make it possible to recognize whether a corresponding one of the AV equipments allows inputting, outputting or inputting and outputting. For example, to the icon 4A of the DVD player module 4, it is indicated by the direction of a graphic form of a triangle that the DVD player module 4 only allows outputting but does not allow inputting. In contrast, it is indicated by two triangles of different directions added to each of the icon 1A of the PC module 1, the icon 2A of the MPEG 1 video deck module 2, the icon 3A of the MO drive module 3, the icon 5A of the CD-R drive module 5 and the icon 6A of the MD drive module 6 that both of inputting and outputting are possible.

Now, it is assumed that, for example, data reproduced by a first module is supplied to a second module so as to be recorded. In this instance, the user will move, in step S23, a pointer 211 to the icon of the first module and perform double clicking to effect an operation of designating the first module. If, for example, the icon 3A of the MO drive module 3 is double clicked, then a window 212 which indicates a title of a video clip recorded on the MO 184 is produced by the graphics accelerator 358 and displayed on the monitor 11 as seen in FIG. 19 in step S24. It is to be noted that also such title information is transferred, upon the initialization operation described hereinabove, as information of function units from the MO drive module 3 to the PC module 1 and stored into the RAM 353. Accordingly, the CPU 351 can cause the graphics accelerator 358 to produce such a window as described above by reading out the information of the function units stored in the RAM 353.

Then, another operation of selecting a second module as a module into which data is to be recorded is performed by moving the pointer 211 and performing double clicking similarly in step S25. Here, if it is assumed that, for example, the icon 5A of the CD-R drive module 5 is double clicked, then the CPU 351 reads out, in step S26, the information of the function units of the CD-R drive module 5 stored in the RAM 353 and causes a symbol graphic form representative of a file of information recorded on the CD-R 154 to be displayed in another window 213. The user can observe the window 212 and the window 213 to recognize the recorded contends of the MO 184 and the recorded condition of the CD-R 154.

Then, the control advances to step S27, in which the user will perform a manual operation to designate a copying source and a copying destination. This operation is performed, for example, by dragging the pointer 211 on a predetermined title on the window 212 for an MO as a copying source and moving the pointer 211 to a predetermined position on the window 213 (to a position of a new file of the number 5 indicated by phantom in FIG. 19) and then dropping the pointer 211.

After a copying source and a copying destination are designated in this manner, the control subsequently advances to step S28, in which the CPU 351 of the PC module 1 discriminates whether or not a format of the copying destination is designated. In particular, as described hereinabove, the information of the function units of the AV equipments illustrated in FIGS. 11 to 15 is stored in the RAM 353 of the PC module 1, and input and output formats are prescribed by the information of the function units. The input format of the CD-R drive 51 of the CD-R drive module 5 which is the copying destination is prescribed to be digital data. In other words, any data can be inputted to the CD-R drive 51 only if the data is digital data, and this signifies that the format of the copying destination is not substantially designated. In such an instance, the process advances to step S30.

In this instance, however, it is assumed that data based on the same standards as those for a video CD is stored on the CD-R 154. Accordingly, to the CD-R drive 51, data must be supplied as data of the MPEG 1 system. Therefore, in this instance, the control advances to step S29, in which the MPEG 1 is designated as the format of the copying destination. After this designation processing is performed, the control advances to step S30.

Figure 20:
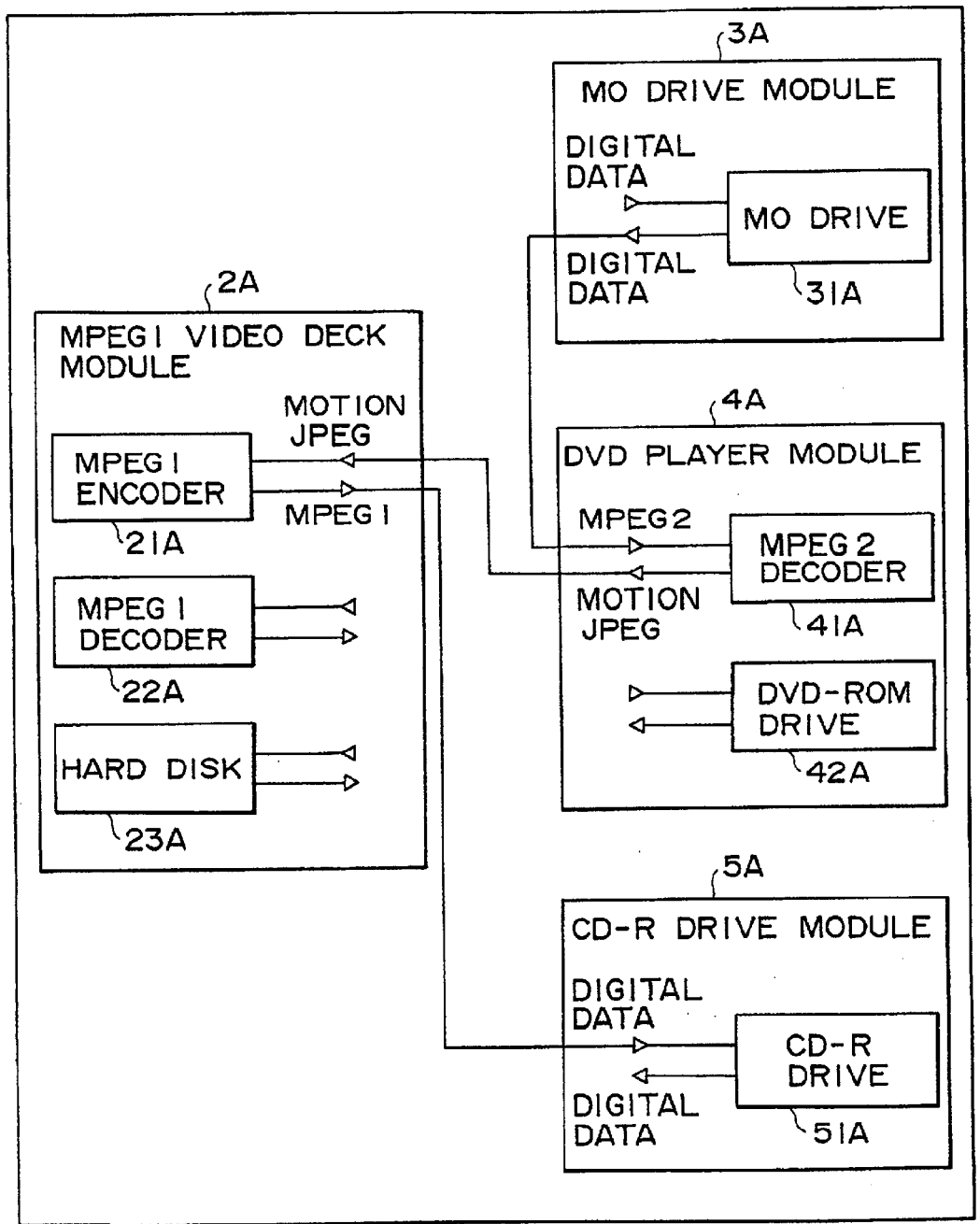
FIG. 20 is a schematic view showing an example of a display of a result of a search for modules.

In step S30, the CPU 351 executes copy route searching processing. In particular, if it is assumed that the file designated to be reproduced from the MO 184 is recorded in the format of the MPEG 2 system, the CPU 351 searches for a route by which the data of the MPEG 2 system can be supplied as data of the MPEG 1 system to the CD-R drive 51 and recorded onto the CD-R 154. Since the format of the data outputted from the MO drive 31 is that of the MPEG 2 system, the data cannot be supplied as it is to the CD-R drive 51. Therefore, as seen in FIG. 20, the data of the MPEG 2 system outputted from the MO drive 31 is supplied to the MPEG 2 decoder 41 of the DVD player module 4 so that it is decoded by the MPEG 2 decoder 41 to produce data of the Motion JPEG system and then the data of the Motion MPEG system is supplied to the MPEG 1 encoder 21 of the MPEG 1 video deck module 2. Then, the data of the Motion JPEG system is encoded into data of the MPEG 1 system by the MPEG 1 encoder 21, and the data of the MPEG 1 system is supplied to the CD-R drive 51 of the CD-R drive module 5. By such routing, data of the MPEG 2 system can be converted into data of the MPEG 1 system and recorded onto the CD-R 154. The CPU 351 searches out such a route as just described.

Then, in step S31, the CPU 351 discriminates whether or not a copying route has been searched out successfully. If the CPU 351 fails in such searching, the control advances to step S32, in which the CPU 351 produces a message such as, for example, "Copy has failed.", and outputs the message from the graphics accelerator 358 to the monitor 11 so as to be displayed on the monitor 11. Consequently, the user can recognize that the designated copying is impossible. For example, in such an instance that the DVD player module 4 is not connected and data of the MPEG 2 system cannot be decoded by the AV equipments connected by the 1394 cable 7 or in a like case, data of the MPEG 2 system cannot be converted into data of the MPEG 1 system. In short, in such a case that the AV equipments connected by the 1394 cable 7 do not have a function for performing format conversion of data (in the example described above, where an equipment having an MPEG 2 decoder is not involved), a copying route cannot be set.

In contrast, if it is discriminated in step S31 that a copying route has been searched out, then the control advances to step S33, in which the CPU 351 controls the graphics accelerator 358 to produce image data corresponding to the copying route and cause the monitor 11 to display the image data thereon. Consequently, for example, such a copying route as shown in FIG. 20 is displayed.

Where a copying route obtained as a result of a search is displayed in this manner, the user can confirm in what processing process data are reproduced and recorded actually.

Thereafter, the control advances to step S34, in which the CPU 351 of the PC module 1 executes processing of producing and outputting commands conforming to the copying route obtained as a result of the search. In particular, in order to realize copying along such a copying route as shown in FIG. 20, a command (C1) for causing the MO 184 to be reproduced by the MO drive module 3 first, another command (C2) for causing the MPEG 2 decoder 41 to decode data supplied from the MO drive module 3 to the DVD player module 4, a further command (C3) for causing the MPEG 1 encoder 21 of the MPEG 1 video deck module 2 to encode data supplied thereto from the MPEG 2 decoder 41 and a still further command (C4) for causing the CD-R drive 51 of the CD-R drive module 5 to record data supplied thereto from the MPEG 1 encoder 21 onto the CD-R 154 are required. Further, the command for the CD-R drive module 5 includes, in addition to a command for recording inputted data onto the CD-R 154, a command for issuing notification of completion of writing to the PC module 1 when writing onto the CD-R 154 comes to an end.

Figure 21A:
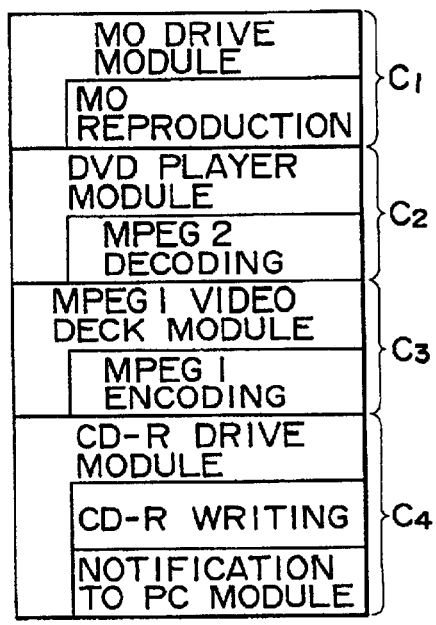
FIGS. 21A–21E are diagrammatic views illustrating a variation of commands.

The CPU 351 produces commands for the modules for execution of such a sequence of processes collectively in a single command set as seen in FIG. 21(A). Where commands are collected into a single command set and transferred to an AV equipment which performs first processing in this manner, the CPU 351 can thereafter execute other processing.

The CPU 351 outputs the commands produced in this manner to the 1394 interface 357 so as to be outputted to the 1394 cable 7. The commands are transmitted to the AV equipments through the 1394 cable 7. While each of the AV equipments receives the commands through the 1394 interface thereof, if any of the commands is not destined for the AV equipment itself, then the AV equipment ignores the commands. However, if one of the commands is destined for the AV equipment itself, then the AV equipment fetches the commands and executes processing defined by the command destined for the self equipment. In the present case, since the destination of the first command C1 is the MO drive module 3, the commands are fetched by the MO drive module 3. Then, the MO drive module 3 executes processing defined by one of the commands destined therefor.

Figure 21B:
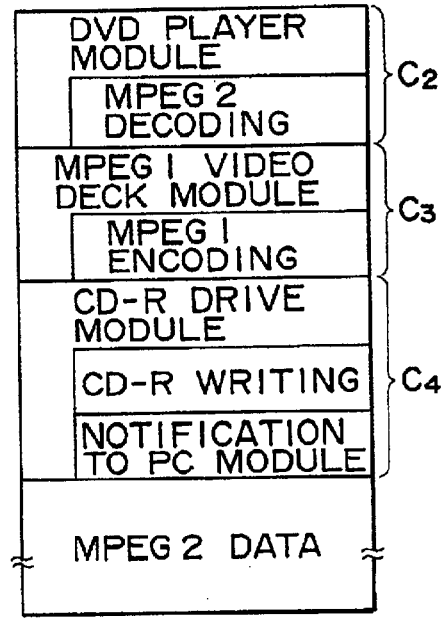
Figure 22:
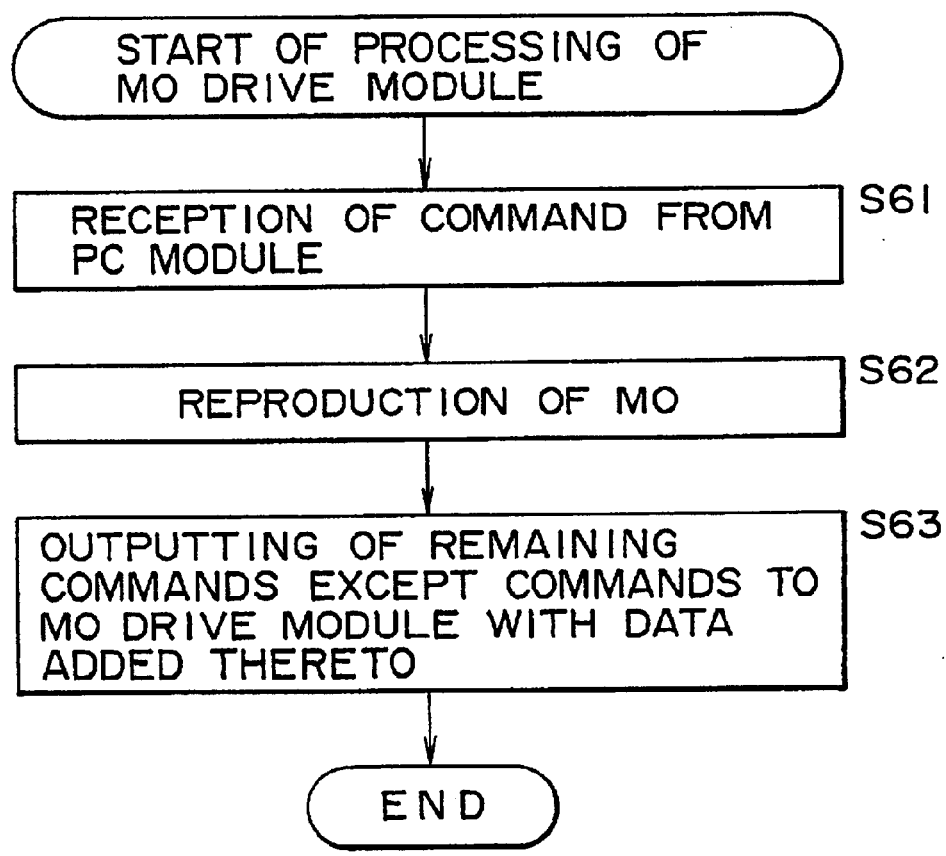
FIG. 22 is a flow chart illustrating operation of the MO drive module shown in FIG. 1.

While details of the processing are described with reference to a flow chart of FIG. 22, briefly the CPU 181 of the MO drive module 3 causes, when the commands are inputted thereto, the MO drive 31 to reproduce the MO 184. Then, data obtained by the reproduction is added to the commands from the PC module 1 except the command C1 destined for the MO drive module 3 itself, that is, the commands C2 to C4, as seen in FIG. 21(B), and the resulting commands are outputted to the 1394 cable 7.

Figure 21C:
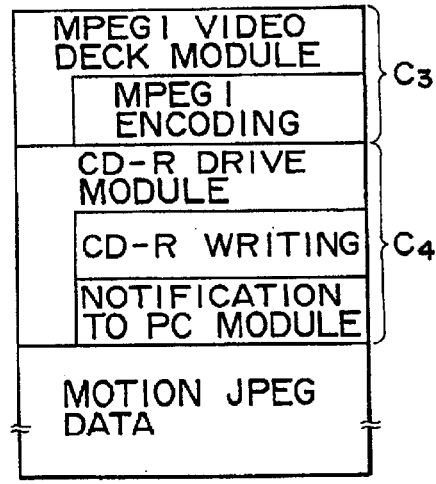
Figure 23:
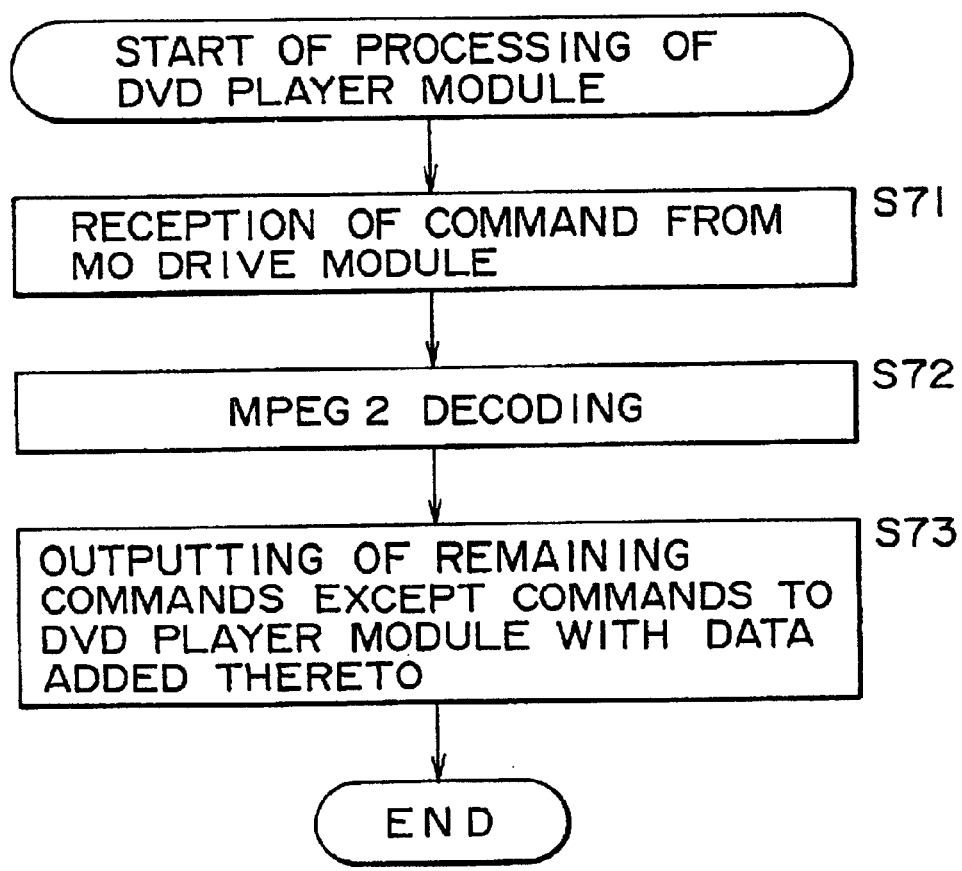
FIG. 23 is a flow chart illustrating operation of the DVD player module shown in FIG. 1.

The commands outputted from the MO drive module 3 are fetched by the DVD player module 4. The CPU 141, which fetches the commands through the 1394 interface 145 of the DVD player module 4, executes decoding processing defined by one of the commands destined for the self equipment, operation of which is hereinafter described with reference to a flow chart of FIG. 23. Then, the CPU 141 adds Motion JPEG data obtained by the processing to the commands C3 and C4 except the command C2 destined for the self equipment as seen in FIG. 21(C), and outputs the resulting commands to the 1394 cable 7.

Figure 21D:
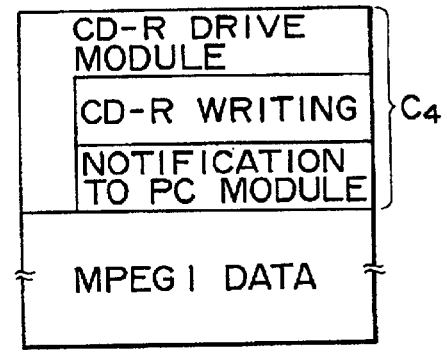
Figure 24:
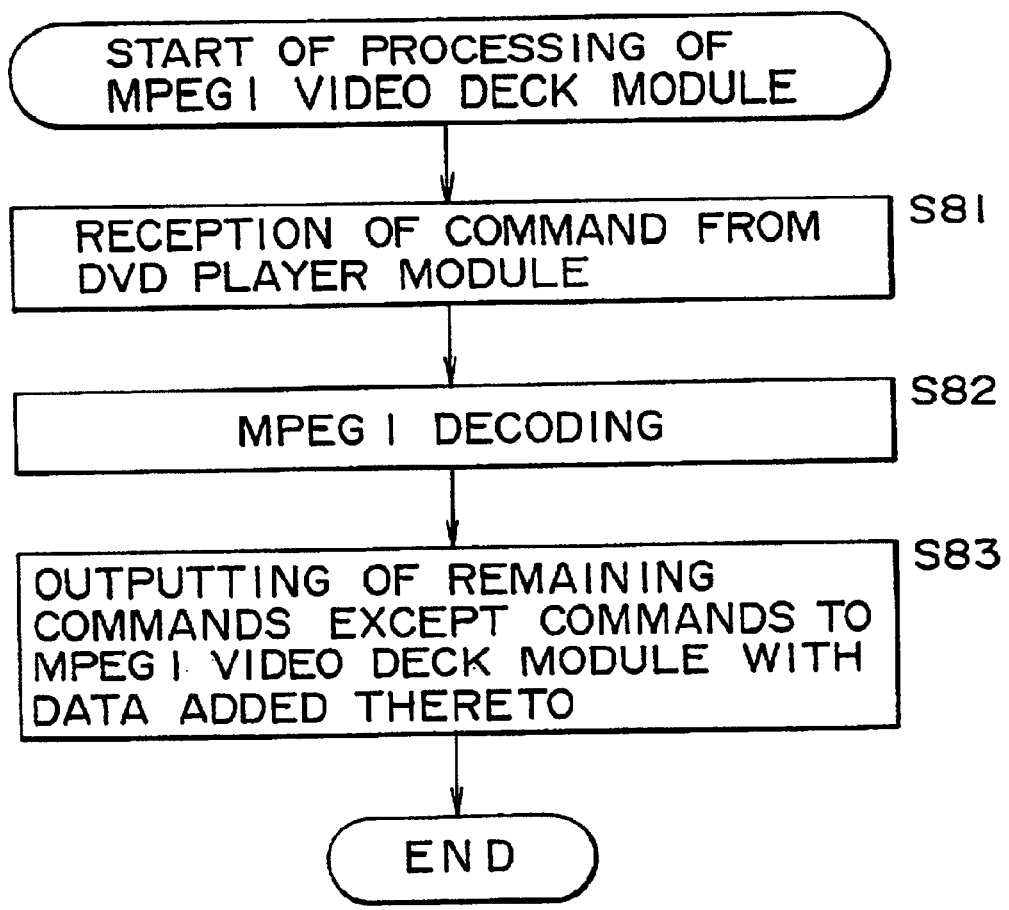
FIG. 24 is a flow chart illustrating operation of the MPEG 1 video deck module shown in FIG. 1.

The commands outputted from the DVD player module 4 are received by the MPEG 1 video deck module 2, and one of the commands destined for the self equipment is executed. While operation then is hereinafter described in detail with reference to a flow chart of FIG. 24, here the inputted data is encoded by the MPEG 1 encoder 21. Then, from between the commands supplied from the DVD player module 4, the command C4 except the command C3 destined for the self equipment is added to the data obtained by the encoding as seen in FIG. 21(D), and the resulting command is outputted to the 1394 cable 7.

Figure 21E:

The command is received by the CD-R drive module 5 as the last AV equipment. Then, processing defined by the inputted command is executed by the CD-R drive module 5. Details of the processing are hereinafter described with reference to a flow chat of FIG. 25. The command for the CD-R drive module 5 includes also a command to issue a notification, when writing onto the CD-R 154 is completed, of the completion of writing to the PC module 1. When this command is executed, the CD-R drive module 5 outputs such a notification as seen in FIG. 21(E) to the 1394 cable 7.

Figure 16B:
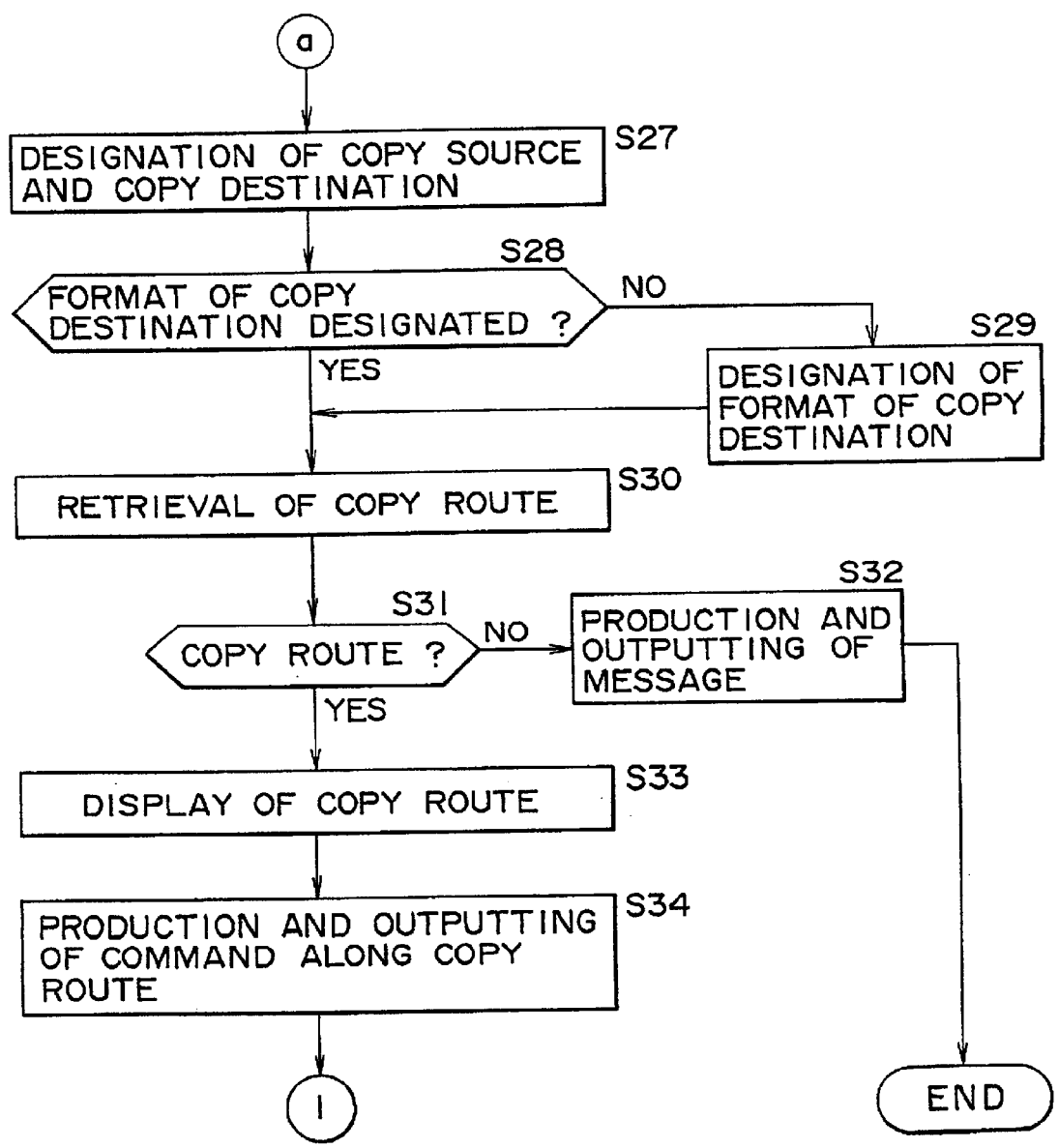
Figure 17:
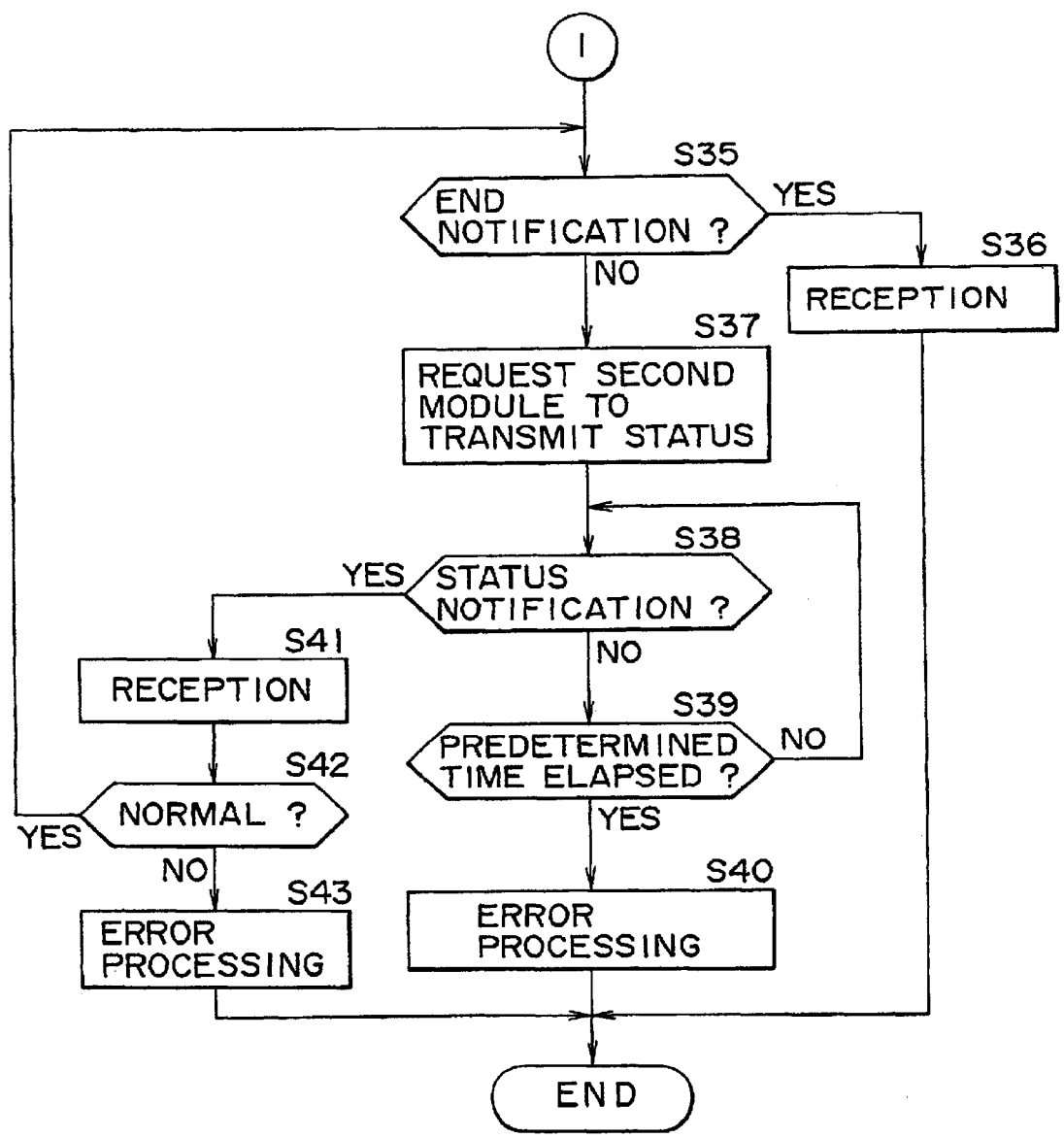

Thus, the CPU 351 of the PC module 1 discriminates, after it produces and outputs the commands in step S34 of FIG. 16, in step S35 of FIG. 17, whether or not a notification representing completion of processing defined by the commands has been inputted. If it is discriminated in step S35 that a notification representative of completion of processing defined by the commands has been transmitted to the PC module 1, then the control advances to step S36, in which the CPU 351 receives the commands through the 1394 interface 357 and confirms completion of the processing defined by the commands produced and outputted in step S34.

If it is discriminated in step S35 that no notification of completion of processing is transmitted to the PC module 1, then the control advances to step S37, in which the CPU 351 requests a second module as a module which is to perform final processing (in the present case, the CD-R drive module 5) for transmission of a status. When the request is received, the CD-R drive module 5 executes processing of checking a status of the CD-R drive module 5 itself and outputting the status. Details of the processing will be hereinafter described with reference to a flow chart of FIG. 26.

The CPU 351 of the PC module 1 further discriminates, in step S38, whether or not a notification of a status has been received from the CD-R drive module 5. If no notification is received from the CD-R drive module 5, then the control advances to step S39, in which the CPU 351 discriminates whether or not a predetermined time has elapsed after the commands are outputted in step S34. If the predetermined time has not elapsed yet, then the processing returns to step S38 so that the processing in steps S38 and S39 is executed repetitively until after the predetermined time elapses.

On the other hand, if it is discriminated in step S39 that the predetermined time set in advance has elapsed, then it is determined that some trouble has occurred with the CD-R drive module 5, and the control advances to step S40, in which error processing is executed.

On the contrary, if it is discriminated in step S38 that a status has been received from the CD-R drive module 5, then the control advances to step S41, in which the CPU 351 receives the status signal and confirms the status of the CD-R drive module 5. Then, the CPU 351 discriminates from the status whether or not the CD-R drive module 5 is normal, and if it is discriminated in step S42 that the CD-R drive module 5 is normal, then the control returns to step S35 so that the processing in the steps beginning with step S35 is repetitively executed.

If it is discriminated in step S42 that the received status indicates that the CD-R drive module 5 is not normal, then the control advances to step S43, in which error processing is executed.

Subsequently, operation of the MO drive module 3 is described with reference to the flow chart of FIG. 22. First, in step S61, the CPU 181 of the MO drive module 3 receives the commands from the PC module 1 through the 1394 interface 185. When the commands are received, the CPU 181 executes one of the commands destined for the self equipment. Since the command designates reproduction processing of an MO as seen from FIG. 21(A), the CPU 181 controls the MO drive 31 to reproduce data recorded on the MO 184 in step S62.

Then, the control advances to step S63, in which the CPU 181 executes processing of adding data obtained by the decoding processing thereof to the remaining commands C2 to C4 except the command C1 destined for the MO drive module 3 itself and outputting the resulting commands. In particular, as seen from FIG. 21(A), the commands received from the PC module 1 include the four parts C1 to C4, and the part C1 is a command destined for the MO drive module 3 itself, and the parts C2, C3 and C4 are commands designated for the DVD player module 4, MPEG 1 video deck module 2 and CD-R drive module 5, respectively, as AV equipments in the later stages. Thus, as seen from FIG. 21(B), the CPU 181 adds MPEG 2 data obtained by the decoding processing to, from among the commands transmitted thereto from the PC module 1, the commands C2, C3 and C4 except the part C1 destined for the MO drive module 3 itself and outputs the resulting commands to the 1394 cable 7 through the 1394 interface 185.

The destination of the commands outputted from the MO drive module 3 is the DVD player module 4. Therefore, processing of the DVD player module 4 is described subsequently with reference to the flow chart of FIG. 23.

In step S71, the CPU 141 of the DVD player module 4 receives one of the commands outputted from the MO drive module 3 which is destined for the DVD player module 4 itself through the 1394 interface 145. This command includes decoding processing by the MPEG 2 decoder 41 as seen in FIG. 21(B). Consequently, the CPU 141 supplies, in step S72, the data (MPEG 2 data) received through the 1394 interface 145 to the MPEG 2 decoder 41 so that the data may be decoded into Motion JPEG data by the MPEG 2 decoder 41.

Then, the control advances to step S73, in which the CPU 141 adds the Motion JPEG data obtained by the processing in step S72 to, from among the commands supplied from the MO drive module 3, the commands C3 and C4 except the command C2 destined for the DVD player module 4 itself and outputs the resulting commands in such a format as seen in FIG. 21(C) to the 1394 cable 7 through the 1394 interface 145.

The destination of the commands outputted from the DVD player module 4 is the MPEG 1 video deck module 2. Thus, processing of the MPEG 1 video deck module 2 is described subsequently with reference to the flow chart of FIG. 24.

In step S81, the CPU 121 of the MPEG 1 video deck module 2 receives one of the commands outputted from the DVD player module 4 which is destined for the MPEG 1 video deck module 2 through the 1394 interface 125. This command includes encoding processing by the MPEG 1 encoder 21 as seen from FIG. 21(C). Therefore, the CPU 121 supplies, in step S82, the data (Motion JPEG data) received through the 1394 interface 125 to the MPEG 1 encoder 21 so that the data may be encoded into MPEG 1 data.

Then, the control advances to step S83, in which the CPU 121 adds the MPEG 1 data obtained by the processing in step S82 to the command C4 except the command part C3 destined for the MPEG 1 video deck module 2 itself from between the commands supplied thereto from the DVD player module 4, and outputs the resulting commands in such a format as illustrated in FIG. 21(D) to the 1394 cable 7 through the 1394 interface 125.

This command is transferred to the CD-R drive module 5 through the 1394 cable 7. The CD-R drive module 5 receiving this command executes such processing as illustrated in the flow chart of FIG. 25.

Figure 25:
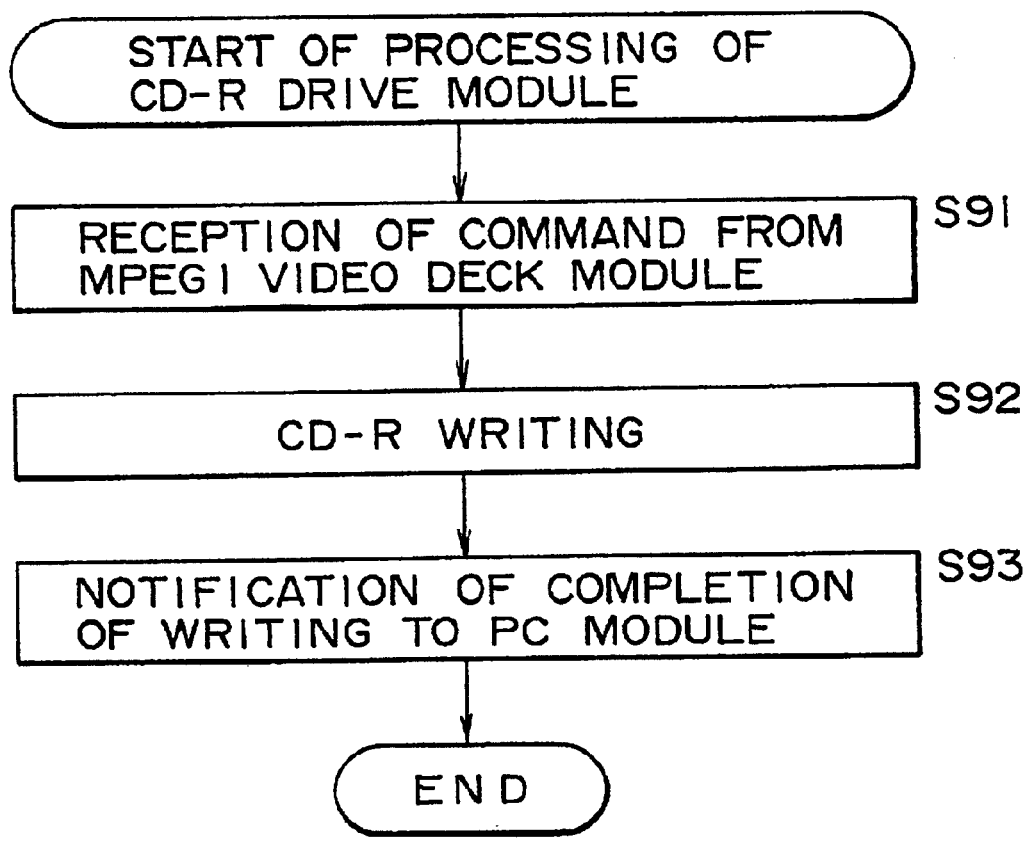
FIG. 25 is a flow chart illustrating operation of the CD-R drive module shown in FIG. 1.

In particular, referring to FIG. 25, first in step S91, the CPU 151 of the CD-R drive module 5 receives the command supplied thereto from the MPEG 1 video deck module 2 through the 1394 interface 155. This command includes writing onto the CD-R 154 and notification to the PC module 1 as seen in FIG. 21(D). Thus, the CPU 151 supplies, in step S92, the MPEG 1 data supplied thereto from the MPEG 1 video deck module 2 to the CD-R drive 51 so that the MPEG 1 data may be recorded onto the CD-R 154. Then, when the recording processing comes to an end, the control sequence advances to step S93, in which the CPU 151 executes processing of notifying the PC module 1 of a signal representative of completion of writing. In particular, the CPU 151 generates a notification representative of completion of writing illustrated in FIG. 21(E) to the PC module 1 and outputs the notification to the PC module 1 through the 1394 interface 155.

This notification is received in steps S35 and S36 of FIG. 17 by the PC module 1 as described hereinabove.

Figure 26:
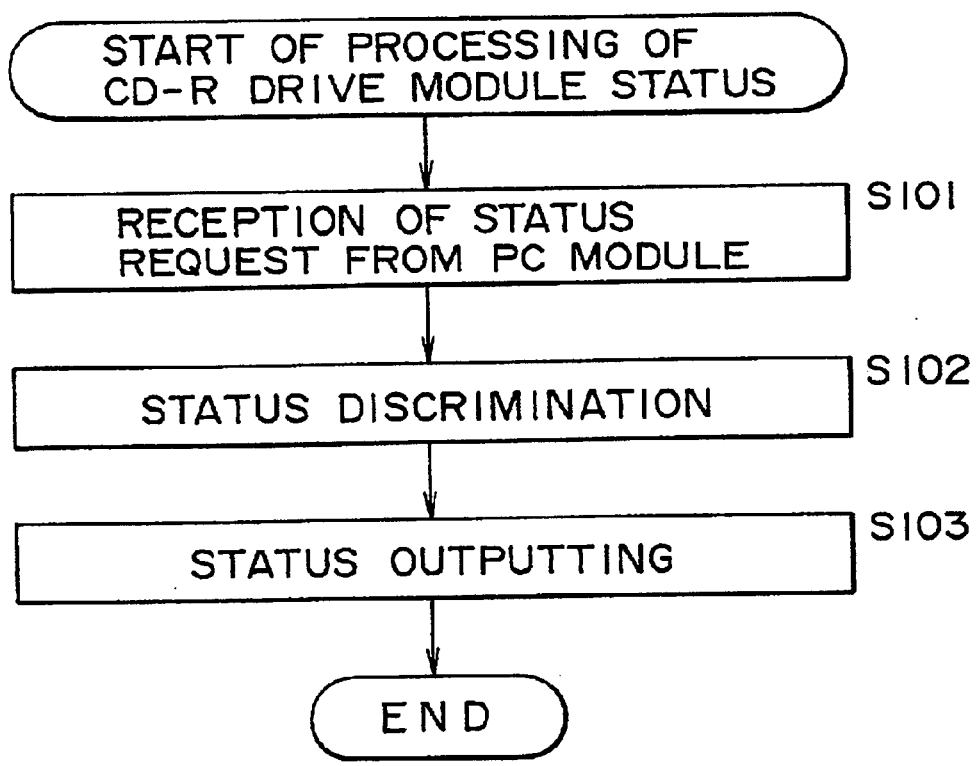
FIG. 26 is a flow chart illustrating operation of status processing of the CD-R drive module shown in FIG. 1.

On the other hand, when a request for transmission of a status is issued from the PC module 1, the CD-R drive module 5 executes processing illustrated in the flow chart of FIG. 26. In particular, first in step S101, the CPU 151 receives the request for status transmission transmitted thereto from the PC module 1. When the request is received, the CPU 151 discriminates in step S102, a status of the CD-R drive module 5 itself and outputs a result of the discrimination as a status toward the PC module 1 in step S103. This status signal is received in steps S38 and S41 of FIG. 17 by the PC module 1. Here, the status may be, for example, that the CD-R drive module 5 is out of order,
  is executing processing as a processing command has been received from another AV equipment,
  has completed processing already and further has completed notification of completion of processing to the PC module 1, does not yet receive a processing command from another AV equipment, and so forth.

It is to be noted that, according to the processing example of the PC module 1 illustrated in the flow charts of FIGS. 16 and 17, when it is discriminated in step S35 that a completion notification is not received, it is discriminated in step S39 whether or not the predetermined time has elapsed. The predetermined time must be set to a comparatively long time because the time required for processing of the MO drive module 3, DVD player module 4 and MPEG 1 video deck module 2 prior to final processing of the CD-R drive module 5 must be taken into consideration. As a result, if, for example, the CD-R drive module 5 is put into a hang-up state by some trouble, it is difficult to detect this rapidly. Thus, subsequently to the processing in step S34 of FIG. 16, processing in steps S111 to S122 illustrated in FIG. 27 may be executed in place of the processing of steps S35 to S43 of FIG. 17.

Figure 27A:
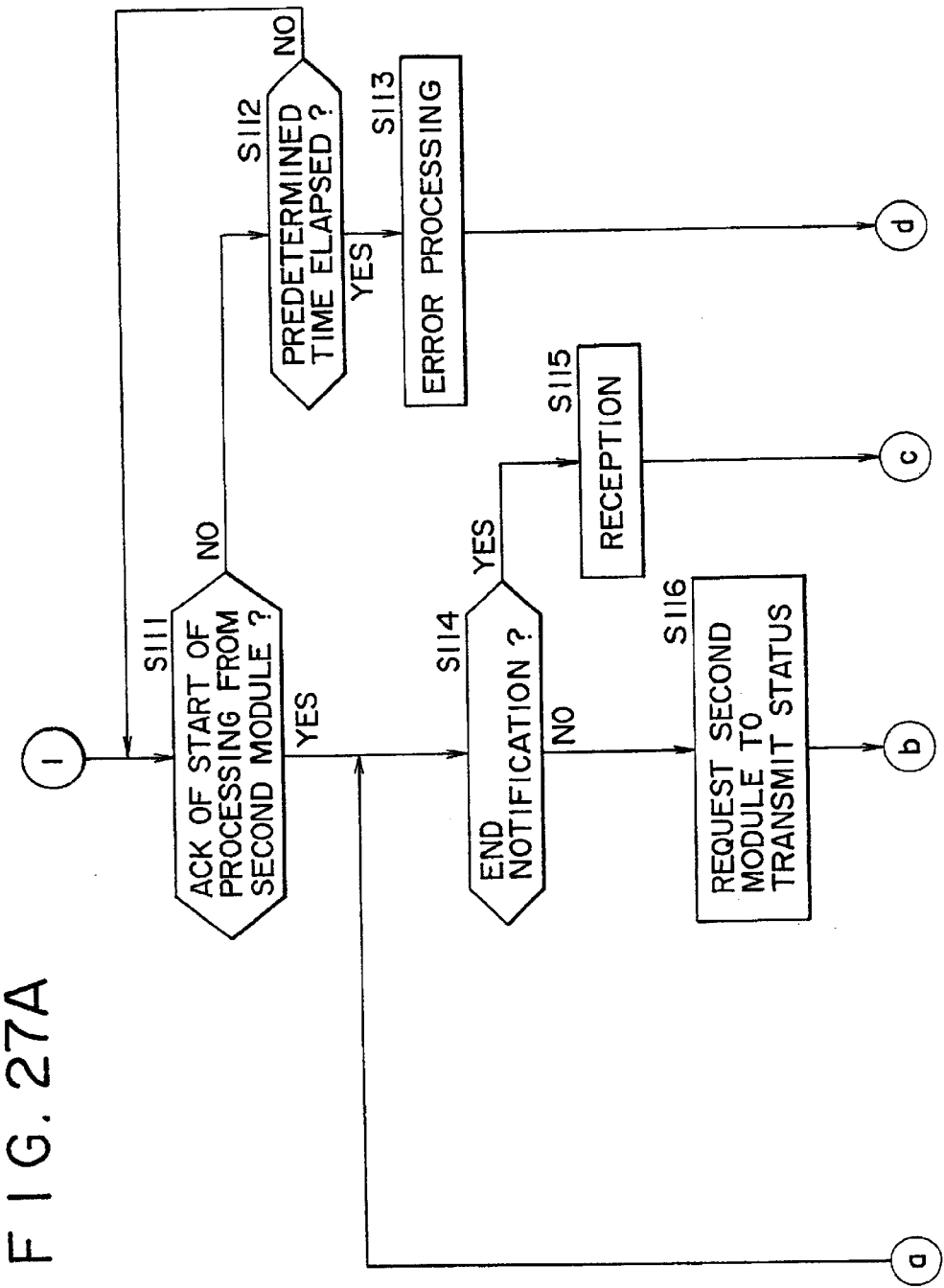
FIG. 27 is a flow chart illustrating another example of processing of the PC module shown in FIG. 1.

In the processing example of FIG. 27, after processing of producing and outputting commands in step S34 of FIG. 16 is completed, the CPU 351 of the PC module 1 discriminates in step S111 whether or not an acknowledge (ACK) signal of starting of processing has been received from the CD-R drive module 5 as a second module. In particular, in the present processing example, when processing is to be started, the CD-R drive module 5 outputs an acknowledge signal to the PC module 1. If it is discriminated in step S111 that an acknowledge signal of starting of processing is not received from the CD-R drive module 5, then the control advances to step S112, in which the CPU 351 discriminates whether or not a predetermined time set in advance has elapsed after commands are produced and outputted in step S34. If the predetermined time has not elapsed as yet, then the control returns to step S111, in which it is discriminated again whether or not an acknowledge signal has been received.

Then, if it is discriminated in step S112 that the predetermined time set in advance has elapsed, then the control advances to step S113, in which the CPU 351 determines that some trouble has occurred with the CD-R drive module 5 and executes error processing.

On the contrary, if it is discriminated in step S111 that an acknowledge signal of starting of processing has been received from the CD-R drive module 5, then processing in step S114 et seq. is executed. The processing in steps S114 to S122 is substantially similar to the processing in steps S35 to S43 of FIG. 17, respectively. In particular, if it is discriminated in step S114 that a completion notification has not been received from the CD-R drive module 5, then the CPU 351 requests the CD-R drive module 5 for transmission of a status in step S116. In step S117, the CPU 351 discriminates whether or not a status notification has been received, and if no status notification has been received, then the CPU 351 discriminates in step S118 whether or not a predetermined time set in advance has elapsed.

The step S118 for discrimination of the predetermined time corresponds to the step S39 of FIG. 17. However, since the discrimination processing of the predetermined time in step S118 is performed in step S111 after a notification of starting of processing is received from the CD-R drive module 5, for the predetermined time, a time to be elapsed after reception of an acknowledge signal of starting of processing can be set. In particular, the set time of step S118 can be set as a time shorter than the set time of step S39 of FIG. 17. In other words, since the predetermined time discriminated in step S39 of FIG. 17 is a time after the CPU 351 of the PC module 1 outputs commands in step S34 of FIG. 16, it must be set to a comparatively long time similarly to the predetermined time in step S112 of the processing example illustrated in FIG. 27. In contrast, since the predetermined time discriminated in step S118 is a time shorter than the predetermined time just described, when some trouble occurs with the CD-R drive module 5, this can be detected comparatively rapidly, and error processing can be executed in step S119.

Since processing in the other steps of FIG. 27 is similar to that in the corresponding steps of FIG. 17, overlapping description of the same is omitted here.

Figure 28B:
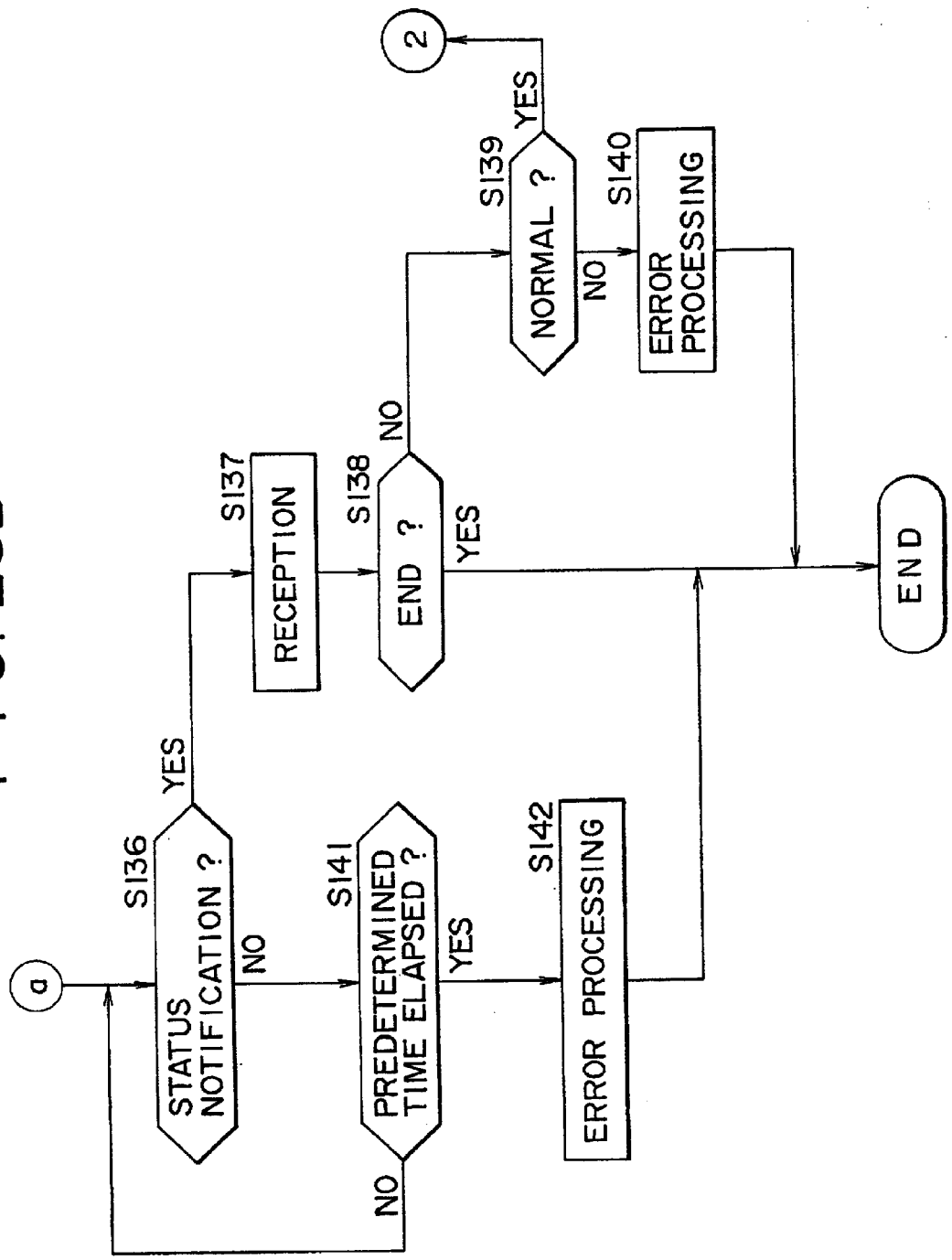
Figure 29:
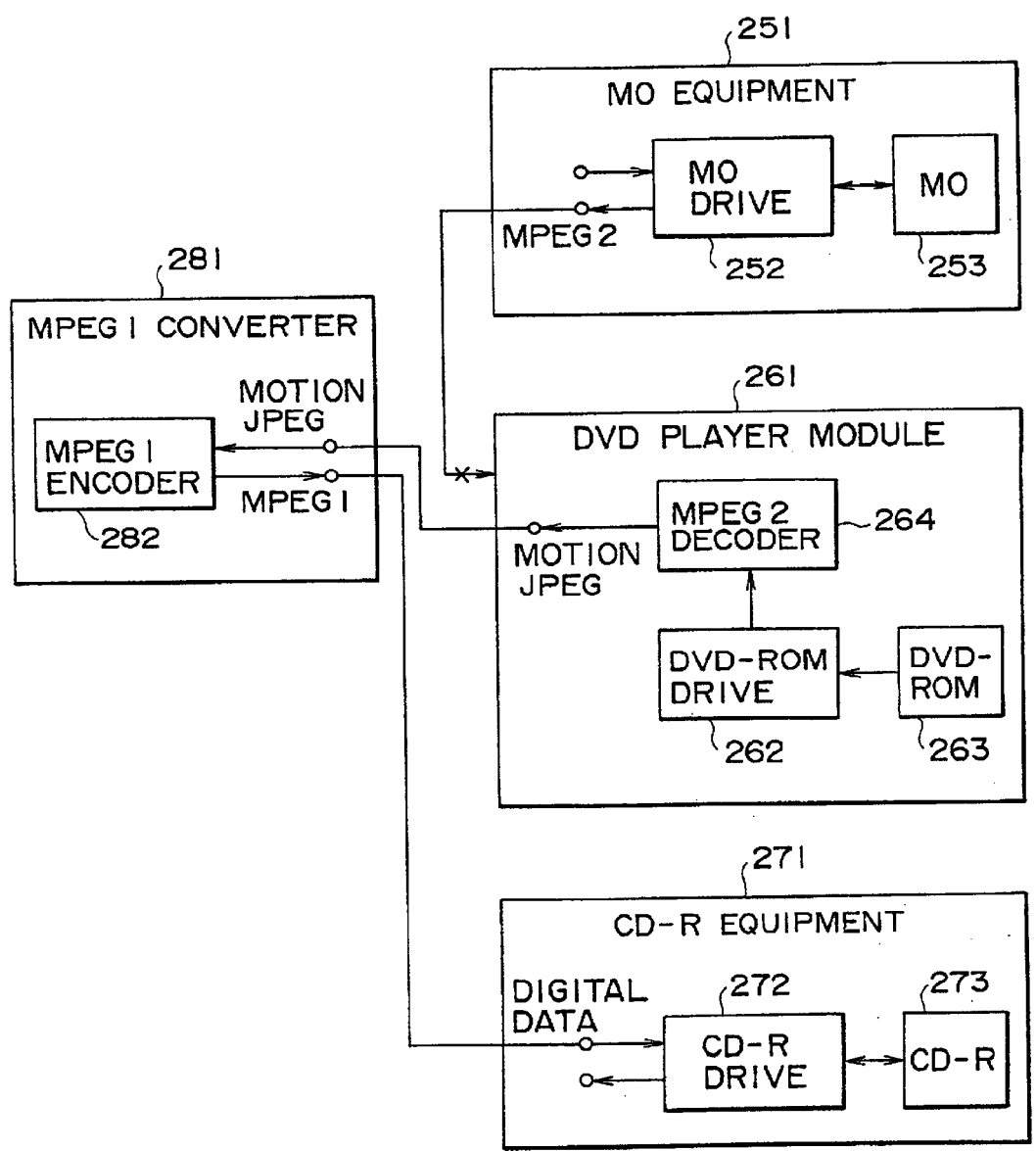
FIG. 29 is a diagrammatic view illustrating a connection condition of a related art AV system.
Figure 30:
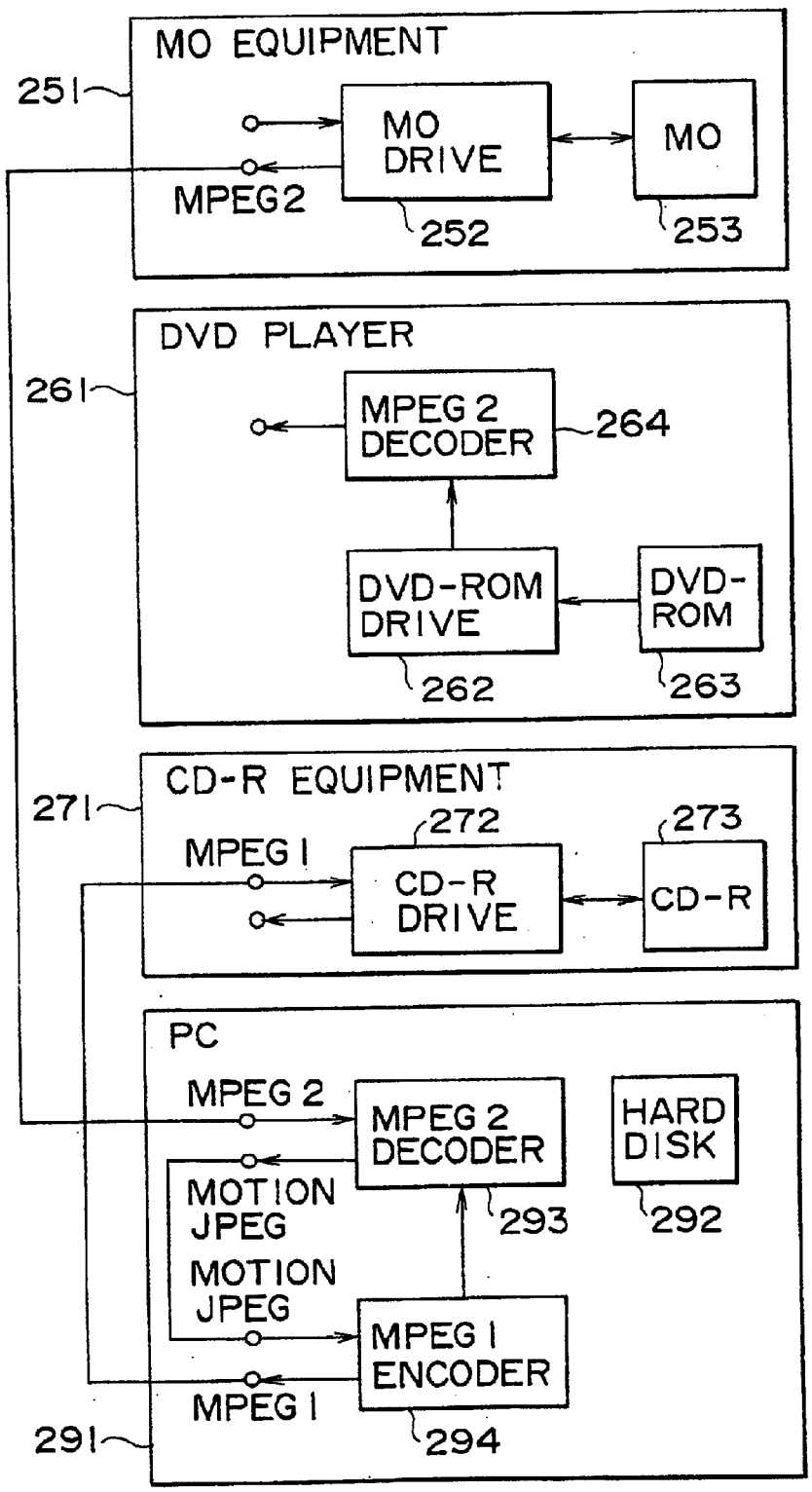
FIG. 30 is a diagrammatic view illustrating another connection condition of a related art AV system.

While, in the processing example described above, a notification of completion of processing is issued from the second module which performs the last processing, it is otherwise possible to place the processing completion notification into a status signal while the command for notification of completion of processing is omitted. An example of processing in this instance is described with reference to FIG. 28. The processing in FIG. 28 is performed following the processing in step S34 of FIG. 16.

In particular, in the present processing example, after the CPU 351 outputs commands in step S34, it discriminates in step S131 whether or not an acknowledge signal of starting of processing corresponding to the commands has been received from the CD-R drive module 5 as a second module. If an acknowledge signal of completion of processing has not been received, then the control advances to step S132, in which it is discriminated whether or not a predetermined time set in advance has elapsed after the issuance of the commands. If the predetermined time has not elapsed as yet, then the control returns to step S131. However, if the predetermined time has elapsed, then the control advances to step S133, in which error processing is executed. The processing in steps S131 to S133 is similar to the processing in steps S111 to S113 of FIG. 27, respectively.

If it is discriminated in step S131 that an acknowledge signal of starting of processing has been received from the CD-R drive module 5, then the control advances to step S134, in which the CPU 351 sets the predetermined time to be discriminated in step S141 in a later stage and starts a timing counting operation for the predetermined time. Then, the control advances to step S135, in which the CPU 351 requests the CD-R drive module 5 for transmission of a status. In step S136, the CPU 351 discriminates whether or not a notification of a status has been received from the CD-R drive module 5, and if no notification has been received, then the control advances to step S141, in which it is discriminated whether or not the predetermined time set in step S134 has elapsed. If the predetermined time has not elapsed, then the control advances to step S136, in which it is discriminated whether or not a notification of a status has been received.

If a notification of a status is not received from the CD-R drive module 5 even after the predetermined time set in step S134 elapses in such a manner as described above, then the control advances to step S142, in which error processing is executed.

On the other hand, if it is discriminated in step S136 that a notification of a status has been received from the CD-R drive module 5, then the control advances to step S137, in which the CPU 351 receives the status, and then to step S138, in which the CPU 351 discriminates whether or not contents of the status indicate completion of processing. If the status from the CD-R drive module 5 indicates completion of processing, then the CPU 351 ends its processing. If it is discriminated in step S138 that the status does not indicate completion of processing corresponding to the command, then the control advances to step S139, in which it is discriminated whether or not the status indicates normal operation. If it is discriminated that the status indicates abnormal operation, then the control advances to step S140, in which error processing is executed.

On the other hand, if it is discriminated in step S139 that the status indicates normal operation, then the control returns to step S134, in which a predetermined time is set again, and then to step S135, in which status transmission is requested. Thereafter, the processing in step S136 et seq. is executed in a similar manner as described above.

According to the processing example described above, since a predetermined time is set every time in step S134, a hand-up state can be detected more rapidly.

While, in the embodiment described above, the PC module 1 and the AV equipments are connected to each other by the 1394 cable 7, it is also possible to connect an electronic equipment other than an AV equipment using the 1394 cable 7. Further, as the network for interconnecting the electronic equipments, a network other than the 1394 cable may be used.

Further, while functions of each module can be divided arbitrarily, each module must be divided into different function units each of which at least has one input, one output or one input and one output.

Having now fully described the invention, it will be apparent to one of ordinary skill in the art that many changes and modifications can be made thereto without departing from the spirit and scope of the invention as set forth herein.

What is claimed is:

1. An electronic equipment controlling apparatus to which one or more electronic equipments are connected by a communication line, comprising:

communication means for communicating with said electronic equipments through said communication line;

control means for requesting each of said electronic equipments to transmit information of any function units included as part of the electronic equipment, each of said function units having at least one of an input and an output;

storage means for storing the information of the function units transmitted from said electronic equipments to said electronic equipment controlling apparatus through said communication line; and selection means for selecting at least one of the function units as a source function unit to output data on an available output and at least one other function unit as a receiving function unit to receive said data from said source function unit on an available input, wherein said control means further searches for a route for transmission of data from the source function unit to the receiving function unit.

2. An electronic equipment controlling apparatus according to claim 1, further comprising outputting means for causing the searched out route to be displayed.

3. An electronic equipment controlling method for controlling one or more electronic equipments connected by a communication line, comprising:

a requesting step of requesting each of said electronic equipments to transmit information of function units included in the electronic equipments, wherein each of the function units have at least one of an input and an output;

a storing step of storing the information of the function units transmitted from said electronic equipment through said communication line;

a selecting step of selecting at least one of the function units as a source function unit to output data on an available output to be provided to a second function unit having at least an available input; and a searching step of searching for a route for transmission of said data from the source function unit to the second function unit.

4. An electronic equipment controlling method according to claim 3, further comprising an outputting step of causing the searched out route to be displayed.

5. An electronic equipment connected to an electronic equipment controlling apparatus by a communication line, comprising:

communication means for communicating with said electronic equipment controlling apparatus through said communication line;

storage means for storing information of function units included in said electronic equipment and each having at least one of an input and an output; and control means for controlling so that, when a request for transmission of the information of the function units is received from said electronic equipment controlling apparatus, the information of the function units is transmitted to said electronic equipment controlling apparatus, wherein, when a command is received from said electronic equipment controlling apparatus representing that the information of one of the function units is selected for data format conversion, said control means performs data format conversion processing independently of the electronic equipment controlling apparatus and corresponding to the command.

6. An electronic equipment according to claim 5, wherein said control means adds, after the processing corresponding to the command is completed, data obtained as a result of the processing to at least part of the command from said electronic equipment controlling apparatus and outputs the resulting command to another electronic equipment.

7. An electronic equipment according to claim 6, wherein, if the command does not include designation of any electronic equipment to which data is to be transmitted, then said control means notifies said electronic equipment controlling apparatus of completion of processing when the processing corresponding to the command is completed.

8. An electronic equipment controlling method for controlling an electronic equipment connected to an electronic equipment controlling apparatus by a communication line, comprising:

a receiving step of receiving a request for transmission of information of the function units from said electronic equipment controlling apparatus; and a transmitting step of controlling, in response to the request for transmission, to transmit information of the function units included in said electronic equipment and each having at least one of an input and an output to said electronic equipment controlling apparatus; and a processing step of performing, when a command is received from said electronic equipment controlling apparatus representing that the information of one of the function units is selected for data format conversion, data format conversion processing independently of the electronic equipment controlling apparatus and corresponding to the command.

9. An electronic equipment controlling method according to claim 8, further comprising an outputting step of adding, after the processing corresponding to the command is completed, data obtained as a result of the processing to at least part of the command from said electronic equipment controlling apparatus and outputting the resulting command to another electronic equipment.

10. An electronic equipment controlling method according to claim 9, further comprising a notifying step of notifying, if the command does not include designation of any electronic equipment to which data is to be transmitted, said electronic equipment controlling apparatus of completion of processing when the processing corresponding to the command is completed.

11. An electronic equipment connected to an electronic equipment controlling apparatus by a communication line, comprising:

communication means for communicating with said electronic equipment controlling apparatus through said communication line;

processing means for performing independently of the electronic equipment controlling apparatus, after receiving a command string containing one of more commands specifying a sequence of processes to be executed by a plurality of electronic equipments in a designated order, a data format conversion process specified by the command string; and outputting means for adding, after the process specified by the command string is completed, data obtained by the process to at least part of the command string and outputting the resulting command string to another one of said electronic equipments.

12. An electronic equipment controlling method performed by an electronic equipment connected to an electronic equipment controlling apparatus by a communication line, comprising:

a processing step of performing independently of the electronic equipment controlling apparatus, after receiving a command string containing one or more commands specifying a sequence of processes to be executed by a plurality of electronic equipments in a designated order, a data format conversion process specified by the command string; and an outputting step of adding, after the process specified by the command string is completed, data obtained as a result of the process to at least part of the command string and outputting the resulting command string to another one of said electronic equipments.

13. An electronic equipment controlling system, comprising:

a plurality of first electronic equipments connected to each other by a communication line; and a second electronic equipment for controlling said first electronic equipments;

each of said first electronic equipments including:

first communication means for communicating with said second electronic equipment through said communication line;

processing means for performing independently of the second electronic equipment, after receiving a command string containing one or more commands specifying a sequence of processes to be executed by a plurality of electronic equipments in a designated order, a data format conversion process specified by the command string; and outputting means for adding, after the process specified by the command string is completed, data obtained as a result of the process to at least part of the command string and outputting the resulting command string to another one of said electronic equipments;

said second electronic equipment including:

control means for producing, based on the order of the processes to be executed by said electronic equipments, a command string specifying a sequence of processes to be performed by designated electronic equipments in a designated order; and second communication means for outputting the produced command string to one or more of said designated electronic equipments through said communication line.

14. An electronic equipment controlling method for an electronic equipment controlling system which includes a plurality of first electronic equipments connected to each other by a communication line, and a second electronic equipment for controlling said first electronic equipments, comprising:

a controlling step by said second electronic equipment of producing, based on an order of processes to be executed by a plurality of electronic equipments, a command string containing one or more commands specifying a sequence of processes to be performed by designated electronic equipments in a designated order;

a communicating step by said second electronic equipment of outputting the produced command string to at least one of said designated electronic equipments through said communication line;

a processing step by one or more of said designated first electronic equipments of performing independently of the second electronic equipment, after receiving a command string, a data format conversion process specified by the command string; and an outputting step by one or more of said designated first electronic equipments of adding, after the process specified by the command string is completed, data obtained as a result of the process to at least part of the command string and outputting the resulting command string to another one of said electronic equipments.

* * * * *